United States Patent [19]

Uchida

[11] Patent Number: 5,651,821

[45] Date of Patent: Jul. 29, 1997

[54] BATTERY DISPOSAL AND COLLECTION APPARATUS

[75] Inventor: Shirou Uchida, Isehara, Japan

[73] Assignee: Ricoh Company, Ltd., Tokyo, Japan

[21] Appl. No.: 495,254

[22] Filed: Jun. 27, 1995

[30] Foreign Application Priority Data

| Jun. 27, 1994 | [JP] | Japan | 6-143723 |
| Oct. 26, 1994 | [JP] | Japan | 6-262143 |
| Dec. 2, 1994 | [JP] | Japan | 6-299213 |
| Feb. 16, 1995 | [JP] | Japan | 7-027816 |

[51] Int. Cl.$^6$ ............................................. B05C 1/00
[52] U.S. Cl. .................. 118/200; 588/249; 588/259; 588/260; 588/900; 206/701; 206/703; 206/704; 206/705; 232/1 R; 320/2; 320/48; 29/730; 29/763
[58] Field of Search ................... 588/249, 259, 588/260, 900; 206/701, 703, 704, 705; 209/608, 659, 660; 29/730, 763; 232/1 R; 320/2, 48; 118/200

[56] References Cited

FOREIGN PATENT DOCUMENTS

| 3418830 | 11/1985 | Germany. |
| 34 18 830 | 11/1985 | Germany. |
| 63-33976 | 3/1988 | Japan. |
| 6-13069 | 1/1994 | Japan. |
| 6-36757 | 2/1994 | Japan. |

*Primary Examiner*—Donald E. Czaja
*Assistant Examiner*—Michael Philip Colaianni
*Attorney, Agent, or Firm*—Oblon, Spivak, McClelland, Maier & Neustadt, P.C.

[57] ABSTRACT

The battery disposal and collection apparatus includes a terminal connection having a terminal electrode pressed by a pressing structure on an upper cover, a battery guide case having a battery container to which the terminal electrode is inserted when the upper cover is closed, and which contains batteries, a rotary plate having an electrode terminal and a battery dropping hole on the plane of a rotary plate under the battery guide case. The electrode terminal contacts the terminal of a battery at the side opposite to the one at the terminal electrode when the terminal of the battery contained in the battery container contacts the terminal electrode. A battery discharger discharges current flowing between the terminal electrode contacting the terminal of the battery contained in the battery container and the electrode terminal. A battery receiver stores the battery which is discharged by the battery discharger and dropped through the battery dropping hole of the rotary plate.

29 Claims, 21 Drawing Sheets

SECTION AA

SECTION AA

SECTION AA

SECTION AA

BATTERY DISPOSAL AND COLLECTION APPARATUS

BACKGROUND OF THE INVENTION

1. Field of the Invention

The present invention relates to a battery disposal and collection apparatus, and, more particularly, to a battery disposal and collection apparatus which can be applied to battery disposing technology for various batteries used as, for example, batteries for power supply or backup for video cameras, cameras, shavers or portable devices, and, particularly, which can make difficult risks such as fire or burns due to heat generation from the batteries to occur, and can improve safety by making difficult heat generation from short-circuiting of terminals of batteries in disposing batteries which are used up and become unavailable.

2. Description of the Related Art

Household electric appliances, office automation equipment, and portable devices have been sold and put in practical use. Many of them constitute their power supply by various batteries. However, various batteries surely have life, and when the life is reached, they must be disposed. In addition, recently, the national and local governments strongly advocate protection of global environment so that collection of various batteries becomes more and more active. In addition, every local government legislates recycle of batteries so that collection and reuse of batteries are promoted as ever.

Such various batteries certainly have remaining electric energy in themselves when they are used up and unavailable because the capacity becomes less than the rated capacity for equipment, or when they reach their life and should be disposed.

Conventionally, the method for disposing such used-up and unavailable batteries is generally to deposit in a battery collection container such as a cardboard box, metal can, or plastic container for temporary storage, and to be subject to disposal by a dedicated company after a predetermined number of days expires.

Conventional battery pack devices containing a number of batteries include those disclosed in Japanese Utility Model Laying-open No. 61-127566 and Japanese Patent Application No. 4-192564. The former battery pack device has an arrangement for covering an output terminal with a cover so that there is an advantage to make difficult short-circuiting at the output terminal. The latter battery pack device has an advantage to assure the safety in disposing the pack device by discharging the life-ended batteries.

SUMMARY OF THE INVENTION

However, in the above-mentioned method for disposing used-up and unavailable batteries, because the batteries which are unavailable but have remaining electric energy are temporarily stored in the battery collection container before disposal by the expert company, particularly when a number of batteries is collected, there is a problem that terminals of batteries come into contact and cause short-circuit to cause the batteries to generate heat so that there may be risks such as fire or burn. For example, when lithium or hydride batteries are corroded by atmospheric water content or the like, solutions leak from corroded batteries, and react with the atmospheric water content or the like to easily cause fire.

In addition, conventionally, because disposal is carried out without separating battery types such as recyclable batteries, inflammable batteries or others, disposal and recycling suitable for the type of battery are difficult to be carried out. Therefore, it is difficult to carry out disposal suitable for lithium batteries which are easily ignited as described above, or NiCd batteries which tend to adversely affect human.

Then, both conventional battery pack devices described above are intended to enhance the safety of the pack device itself, and not to enhance the safety when the battery itself is disposed.

Thus, the present invention is intended to provide a battery disposal and collection device which can make difficult occurrence of risks such as fire or burns due to heat generation from the batteries by making difficult heat generation from short-circuiting of terminals of batteries in disposing batteries which are used up and unavailable so that the safety can be enhanced, and which enables it to carry out disposal and recycling suitable for each battery by separating the types of batteries.

The first feature of the present invention comprises an upper cover, pressing means provided on the upper cover, terminal connection means connected to the pressing means and having a terminal electrode pressed by the pressing means, a battery guide case opened and closed by the upper cover, inserted with the terminal electrode when the upper cover is closed, and having a battery container for containing batteries, rotary plate means having an electrode terminal and a battery dropping hole on a rotary plate under the battery guide case, the electrode terminal being provided under the battery guide case at the side opposite to the upper cover, and, when a terminal of a battery contained in the battery container contacts the terminal electrode, contacting the terminal of the battery opposite to the one at the terminal electrode, the battery dropping hole causing the battery contained in the battery container to pass through, battery discharge means for discharging current flowing between the terminal electrode of the terminal connection means contacting the terminal of battery contained in the battery container and the electrode terminal of the rotary plate means, and battery receiving means provided under the rotary plate means at the side opposite to the upper cover and for storing the battery, the battery being discharged by the battery discharge means and dropped through the battery dropping hole of the rotary plate means.

The second feature of the present invention is the first feature, wherein the terminal connection means consists of a guide plate and a compression spring so that the position of contact point at the terminal electrode with the battery contained in the battery container can be varied.

The third feature of the present invention is the first or second feature, wherein the rotary plate means has rotary drive means for rotating and moving the rotary plate to a predetermined position so that the electrode terminal and the position of the battery dropping hole can be varied.

The fourth feature of the present invention is any one of the first to third features, wherein the rotary plate means rotates the rotary plate so that, when a terminal of the battery contained in the battery container is put into contact with the terminal electrode of the terminal connection means, the electrode terminal is put into contact with the terminal of the battery opposite to that contacting the terminal electrode, and rotates the rotary plate so that, after discharging, the battery contained in the battery container is dropped in the battery receiving means, and the battery dropping hole is positioned at the position of a battery contained in the battery container.

The fifth feature of the present invention is any one of the first to fourth features, wherein the battery discharge means is made the standby state by containing the battery in the battery container, closing the battery guide case with the upper cover, and connecting the terminals of the battery to the terminal electrode and the electrode terminal, respectively, and then is operated by turning on a switch located on a operation panel of the apparatus.

The sixth feature of the present invention is any one of the first to fifth features, wherein the battery discharge means has, on a connection line, a switch closing a connection line between output terminals of the terminal electrode and the electrode terminal, and a resistor for buffering short-circuit current flowing between the output terminals when the connection line is closed by the switch.

The seventh feature of the present invention is a battery disposal and collection apparatus comprising an upper cover, pressing means provided on the upper cover, terminal connection means connected to the pressing means and having a terminal electrode pressed by the pressing means, a battery guide case opened and closed by the upper cover, inserted with the terminal electrode when the upper cover is closed, and having a battery receiving hole for containing batteries, rotary plate means having an electrode terminal and a battery dropping hole on a rotary plate under the battery guide case, the electrode terminal being provided under the battery guide case at the side opposite to the upper cover, and, when a terminal of a battery contained in the battery receiving hole contacts the terminal electrode, contacting the terminal of the battery opposite to the one at the terminal electrode, the battery dropping hole causing the battery contained in the battery receiving hole to pass through, battery discharge means for discharging current flowing between the terminal electrode of the terminal connection means contacting the terminal of battery received in the battery receiving hole and the electrode terminal of the rotary plate means, and battery container provided under the rotary plate means at the side opposite to the upper cover and for storing the battery, the battery being discharged by the battery discharge means and dropped through the battery dropping hole of the rotary plate means, wherein the battery has battery separation and detection means arranged on a part of the guide case, and identifying the type of battery based on an identification mark for identifying the type of battery provided on the battery contained in the battery containing hole, and the battery container receives the battery based on the identified type of battery.

The eighth feature of the present invention is the seventh feature further comprising rotary drive means for rotating and moving at least either one of the battery guide case or a battery separation case of the battery container to a predetermined position.

The ninth feature of the present invention is the seventh or eighth feature, wherein the rotary plate means rotates the rotary plate so that, when a terminal of the battery received in the battery receiving hole is put into contact with the terminal electrode of the terminal connection means, the electrode terminal is put into contact with the terminal of the battery opposite to that contacting the terminal electrode, the battery discharge means discharges the battery, the battery separation and detection means identifies the type of battery, the rotary drive means rotates at least either one of the battery guide case or the battery separation case to a predetermined position so as to receive the battery in the battery separation case corresponding to the identified type of battery, and the rotary plate means rotates the rotary plate so that the battery dropping hole is positioned at the position of the battery received in the battery receiving hole to drop in the battery separation case corresponding to the identified type of battery.

The tenth feature of the present invention is any one of the seventh to ninth feature, wherein the battery separation case has a dedicated battery case divided into at least two, a rotation shaft and gears being arranged at the center of case, the case body being supported by a guide, recesses being arranged in the circumferential direction on the outer side of the case, a groove opposite to the recess being provided in the battery container containing the case, a bearing arranged with a ball, a compression spring, and a ball stopping plate being constituted in the groove.

The eleventh feature of the present invention comprises an upper case, pressing means provided on the upper cover, a cap holder for containing and holding an insulative cap pressed by the pressing means, and provided on the upper cover, a battery guide case having a battery container for containing the battery, opened and closed by the upper cover, and inserting the insulative cap at the top of the cap holder into the terminal of the battery contained in the battery container when the upper cover is closed, rotary plate means having a battery mounting section and a battery dropping hole, the battery mounting section being provided under the battery guide case at the side opposite to the upper cover, and contacting the terminal of the battery opposite to the cap holder when the insulative cap of the cap holder is inserted into the terminal of the battery contained in the battery container, the battery dropping hole causing the battery contained in the battery container to pass through, and battery receiving means provided under the rotary plate means at the side opposite to the upper cover and for storing the battery, the battery being dropped through the battery dropping hole of the rotary plate means, in which the terminal of the battery is insulated by the insulative cap of the cap holder.

The twelfth feature of the present invention is the eleventh feature, wherein the pressing means consists of a spring and a pressing plate pressed by the spring.

The thirteenth feature of the present invention is the eleventh or twelfth feature, wherein the rotary plate means has rotary drive means for rotating and moving the rotary plate to a predetermined position so that the positions of the battery mounting section and the battery dropping hole can be varied.

The fourteenth of the present invention is any one of the eleventh to thirteenth features, wherein the rotary plate means rotates the rotary plate so that, when the insulative cap of the cap holder is inserted into a terminal of the battery contained in the battery container, the battery mounting section is put into contact with the terminal of the battery opposite to that contacting the cap holder, and rotates the rotary plate so that, when the insulative cap of the cap holder is inserted into a terminal of the battery for insulation, the battery contained in the battery container is dropped in the battery receiving means, and the battery dropping hole is positioned at the position of a battery contained in the battery container.

The fifteenth feature of the present invention is any one of the eleventh to fourteenth feature, wherein the rotary plate means is made the standby state by receiving the battery on the battery mounting section in the battery container, and closing the battery guide case with the upper cover to insert the insulative cap of the cap holder into a terminal of the battery mounted on the battery mounting section, and operated by turning on a switch located on a operation panel of the apparatus.

The sixteenth feature of the present invention is any one of the eleventh to fifteenth feature further comprising remaining quantity sensing means for sensing remaining quantity of insulative caps in the cap holder, and warning means for warning the operator when the sensed remaining quantity of insulative cap becomes less than a predetermined quantity.

The seventeenth feature of the present invention is any one of the eleventh to sixteenth feature further comprising remaining quantity sensing means for sensing remaining quantity of insulative caps in the cap holder, and stop means for stopping the operation of the rotary plate means when the sensed remaining quantity of insulative cap becomes less than a predetermined quantity.

The eighteenth feature of the present invention comprises an upper cover, electrical insulation agent container provided on the upper cover and for containing electrical insulation agent, electrical insulation agent application means having a nozzle for applying the electrical insulation agent discharged from the electrical insulation agent container, a battery guide case opened and closed by the upper cover, inserted with the nozzle to contact a terminal of the battery when the upper cover is closed, and having a battery container for containing the battery, rotary plate means having a battery mounting section and a battery dropping hole on a rotary plate under the battery guide case, the battery mounting section being provided under the battery guide case at the side opposite to the upper cover, putting the terminal of the battery contained in the battery container into contact with the nozzle, and contacting the terminal of the battery opposite to the nozzle side when the electrical insulation agent is applied on the terminals of battery from the nozzle for insulation, the battery dropping hole causing the battery contained in the battery container to pass through, battery receiving means provided under the rotary plate means at the side opposite to the upper cover, and for storing the battery dropped through the battery dropping hole of the rotary plate means, the terminals of the battery being insulated by the electrical insulation agent application means.

The nineteenth feature of the present invention is the eighteenth feature, wherein the electrical insulation agent application means partitions the electrical insulation agent container and the nozzle, and comprises a partition plate which has a groove for introducing the electrical insulation agent in the electrical insulation agent container to a nozzle container, a rotatable ball provided in a nozzle opening, and a compression spring pressing the ball.

The twentieth feature of the present invention is the eighteenth or nineteenth feature, wherein the rotary plate means has rotary drive means for rotating and moving the rotary plate to a predetermined position so that the positions of the battery mounting section and the battery dropping hole can be varied.

The twenty-first feature of the present invention is any one of the eighteenth to twentieth features, wherein the rotary plate means rotates the rotary plate so that, when a terminal of the battery contained in the battery container is put into contact with the nozzle of the electrical insulation agent application means, the battery mounting section is put into contact with the terminal of the battery opposite to the nozzle side, and rotates the rotary plate so that, after the terminal of the battery is insulated by applying the electrical insulation agent with the nozzle, the battery contained in the battery container is dropped in the battery receiving means, and the battery dropping hole is positioned at the position of battery contained in the battery container.

The twenty-second feature of the present invention is any one of the eighteenth to twenty-first features, wherein the rotary plate means is made the standby state by receiving the battery on the battery mounting section in the battery container, and closing the battery guide case with the upper cover to causing the nozzle to contact the terminal of the battery in the battery container, and operated by turning on a switch located on a operation panel of the apparatus.

The twenty-third feature of the present invention is any one of the eighteenth to twenty-second features, wherein the electrical insulation agent application means rotates the ball provided in the nozzle opening by rotational movement of the rotary plate, the ball being put into contact with the terminal of the battery by rotational movement of the battery on the battery mounting section, applies the electrical insulation agent attached on the ball on the terminal of the battery contacting the ball, and applies on the terminal of the battery the electrical insulation agent which flows out through a gap between the ball and the nozzle opening caused from the contact between the ball and the terminal of the battery.

The twenty-fourth feature of the present invention is the twenty-third feature, wherein the flow rate of the electrical insulation agent from the electrical insulation agent container to the nozzle container is controlled by air pressure on the liquid surface of the electrical insulation agent in the nozzle container.

The twenty-fifth feature of the present invention is any one of the eighteenth to twenty-fourth features further comprising remaining amount sensing means for sensing remaining amount of the electrical insulation agent in the electrical insulation agent container, and warning means for warning the operator when the sensed remaining amount of the electrical insulation agent becomes less than a predetermined amount.

The twenty-sixth feature of the present invention is any one of the eighteenth to twenty-fifth features further comprising remaining amount sensing means for sensing remaining amount of the electrical insulation agent in the electrical insulation agent container, and stop means for stopping the operation of the rotary plate means when the sensed remaining amount of the electrical insulation agent becomes less than a predetermined amount.

According to the first feature of the present invention, because the terminals of the battery contained in the battery container are put into contact with the terminal electrode of the terminal connection means and the output terminal of the electrode terminal of the rotary plate means so that the battery can be completely discharged through the output terminal, it is possible to prevent short-circuiting even if the terminals of the batteries contact with each other while the discharged batteries are temporarily stored in the battery container.

Accordingly, it is possible to prevent generation of heat from contact of the terminals of the battery so that risks such as fire or burn can be prevented.

According to the second feature of the present invention, the terminal connection means comprises the guide plate and the compression spring so that the position of contact at the terminal electrode with the battery contained in the battery container can be freely varied.

Thus, it is possible to improve the reliability of connection between the terminal electrode of the terminal connection means and the terminal of the battery because the terminal electrode of the terminal connection means can be efficiently and perfectly put into contact with the terminal of the battery contained in the battery container by pressing the terminal electrode of the terminal connection means with the compression spring, and adjusting the pressing force of the compression spring with the guide plate provided on the battery guide case.

According to the third feature of the present invention, the rotary plate means is constituted to have the rotary drive means for rotating and moving the rotary plate to a predetermined position so that the electrode terminal and the position of the battery dropping hole can be varied.

Thus, because the electrode terminal of the rotary plate and the position of the battery dropping hole can be suitably varied by rotating the rotary plate, when the battery is disposed, the electrode terminal of the rotary plate can be automatically positioned to surely put the terminal electrode into contact with the terminal of the battery contained in the battery container at the opposite side, and to be at the position of the terminal of the battery. In addition, after the battery is discharged, the dropping hole can be automatically positioned at the position of the battery in the battery container.

According to the fourth feature of the present invention, the rotary plate means is constituted to rotate the rotary plate to put the electrode terminal into contact with the terminal of the battery at the side opposite to the terminal electrode when the terminal of the battery contained in the battery container is put into contact with the terminal electrode of the terminal connection means, and to rotate the rotary plate to drop the battery contained in the battery container into the battery receiving means when the battery is discharged, and to position the battery dropping hole at the position of the battery contained in the battery container. Thus, the rotary plate means can automatically and efficiently perform the operations for contacting the terminal of the battery and for dropping the battery into the battery receiving means.

According to the fifth feature of the present invention, the battery discharge means is constituted to be made the standby state by containing the battery in the battery container, closing the battery guide case with the upper cover, and connecting the terminals of the battery to the terminal electrode and the electrode terminal, respectively, and then is operated by turning on a switch located on an operation panel of the apparatus.

Thus, the standby state cannot be attained if the upper cover is not closed, and the discharging cannot be performed unless the switch is turned on so that discharging of battery can be performed with a simple operation while assuring the safety.

According to the sixth feature of the present invention, the battery discharge means is constituted to have, on a connection line, a switch closing a connection line between output terminals of the terminal electrode and the electrode terminal, and a resistor for buffering short-circuit current flowing between the output terminals when the connection line is closed by the switch.

Thus, because the discharge line with predetermined resistance can be closed by the switch, discharge can be gradually and stably performed while suppressing heat generation at the output terminal.

According to the seventh feature of the present invention, it is constituted that the terminals of the battery received the battery receiving hole are put into contact with the terminal electrode of the terminal connection means and the output terminal of the electrode terminal of the rotary plate means, the battery being completely discharged through the output terminal.

Thus, it is possible not to cause short-circuiting even if the terminals of batteries contact each other while the discharged batteries are temporarily stored in the battery container. Accordingly, because heat can be prevented from generation due to contact of the terminals of the batteries, risks such as fire or burn can be prevented.

According to the seventh feature of the present invention, it is constituted that the type of battery is identified based on the identification mark for identifying the type of battery provided on the battery containing hole, and the battery is separated by receiving the battery in the battery container based on the identified type of battery.

Thus, because the batteries can be received in the battery container by the type of battery for separation, disposal and recycling suitable for respective types of battery can be performed.

According to the eighth feature of the present invention, it is constituted to have the rotary drive means for rotating and moving at least either one of the battery guide case or a battery separation case of the battery container to a predetermined position.

Thus, the battery identified for its type in the battery guide case can be efficiently received in a predetermined position in the battery separation case through the battery dropping hole in the rotary plate by rotatably moving at least one of the battery guide case or the battery separation case to a predetermined position.

According to the ninth feature of the present invention, it is constituted that the rotary plate means rotates the rotary plate so that, when a terminal of the battery received in the battery receiving hole is put into contact with the terminal electrode of the terminal connection means, the electrode terminal is put into contact with the terminal of the battery opposite to that contacting the terminal electrode, the battery discharge means discharges the battery, the battery separation and detection means identifies the type of battery, the rotary drive means rotates at least either one of the battery guide case or the battery separation case to a predetermined position so as to receive the battery in the battery separation case corresponding to the identified type of battery, and the rotary plate means rotates the rotary plate so that the battery dropping hole is positioned at the position of the battery received in the battery receiving hole to drop the battery in the battery separation case corresponding to the identified type of battery.

Thus, the rotary plate means can automatically and efficiently perform contact between the terminal of the battery received in the battery receiving hole and the electrode terminal of the rotary plate, and dropping of the battery completed for discharging and identification contained in the battery containing hole into the battery container. In addition, the rotary drive means can automatically and efficiently position the battery guide case and the battery separation case so that the battery completed for discharging and identification received in the battery receiving hole is contained in the battery separation case corresponding to the identified type of battery.

According to the tenth feature of the present invention, it is constituted that the battery separation case has a dedicated battery case divided into at least two, a rotation shaft and gears being arranged at the center of case, the case body being supported by a guide, recesses being arranged in the circumferential direction on the outer side of the case, a groove opposite to the recess being provided in the battery container containing the case, a bearing arranged with a ball, a compression spring, and a ball stopping plate being constituted in the groove.

Thus, the battery separation case be easily and smoothly rotated and moved.

According to the eleventh feature of the present invention, it is constituted to comprise an upper cover, pressing means provided on the upper cover, a cap holder for containing and holding an insulative cap pressed by the pressing means, and provided on the upper cover, a battery guide case having a battery container for containing the battery, opened and closed by the upper cover, and inserting the insulative cap at the top of the cap holder into the terminal of the battery contained in the battery container when the upper cover is closed, rotary plate means having a battery mounting section and a battery dropping hole, the battery mounting section being provided under the battery guide case at the side opposite to the upper cover, and contacting the terminal of the battery opposite to the cap holder when the insulative cap of the cap holder is inserted into the terminal of the battery contained in the battery container, the battery dropping hole causing the battery contained in the battery container to pass through, and battery receiving means provided under the rotary plate means at the side opposite to the upper cover and for storing the battery, the battery being dropped through the battery dropping hole, in which the terminal of the battery is insulated by the insulative cap of the cap holder.

Thus, because the terminal of battery can be insulated by inserting the insulative cap in the cap holder into the terminal of the battery contained in the battery container, it is possible not to cause short-circuiting even if the terminals of batteries contact each other while the insulated batteries are temporarily stored in the battery receiving means.

Accordingly, because heat can be prevented from generation due to contact of the terminals of the batteries, risks such as fire or burn can be prevented.

According to the twelfth feature of the present invention, the pressing means consists of a spring and a pressing plate pressed by the spring so that, when the insulative cap in the cap holder is inserted into the terminal of the battery contained in the battery container by closing the upper cover, the insulative cap in the cap holder can be surely and stably inserted into the terminal of the battery contained in the battery container by suitably adjusting the pressing force of the spring for pressing the insulative cap provided on the pressing plate.

According to the thirteenth feature of the present invention, the rotary plate means is constituted for rotating and moving the rotary plate to a predetermined position with the rotary drive means so that the positions of the battery mounting section and the battery dropping hole can be varied.

Thus, because the positions of the battery mounting section on the rotary plate and the battery dropping hole can be suitably adjusted by rotating the rotary plate, when the terminal of the battery is insulated, the battery mounting section of the rotary plate can be automatically positioned at the position of the terminal of the battery received in the battery container opposite to the cap holder, and the battery dropping hole can be automatically positioned at the position of the battery in the battery container after insulating the terminal of the battery.

According to the fourteenth feature of the present invention, it is constituted that the rotary plate means rotates the rotary plate so that, when the insulative cap of the cap holder is inserted into a terminal of the battery contained in the battery container, the battery mounting section is put into contact with the terminal of the battery opposite to that contacting the cap holder, and rotates the rotary plate so that, when the insulative cap of the cap holder is inserted into a terminal of the battery for insulation, the battery contained in the battery container is dropped in the battery receiving means, and the battery dropping hole is positioned at the position of a battery contained in the battery container.

Thus, when the terminal of the battery is insulated, the rotary plate can be rotated so that the battery mounting section is positioned at the terminal of the battery opposite to the cap holder, and, after the terminal of the battery is insulated, can be rotated so that the battery dropping hole is positioned at the position of the battery received in the battery container.

Accordingly, the rotary plate means can automatically and efficiently insulate the terminal of the battery, and drop the battery into the battery receiving means.

According to the fifteenth feature of the present invention, it is constituted that the rotary plate means is made the standby state by receiving the battery on the battery mounting section in the battery container, and closing the battery guide case with the upper cover to insert the insulative cap of the cap holder into a terminal of the battery mounted on the battery mounting section, and operated by turning on a switch located on an operation panel of the apparatus.

Thus, the standby state cannot be attained if the upper cover is not closed, and the rotary plate cannot be rotated unless the switch is turned on so that the insulation of battery can be performed with a simple operation while assuring the safety.

According to the sixteenth feature of the present invention, it is constituted to sense remaining quantity of insulative caps in the cap holder with the remaining quantity sensing means, and to warn the operator with the warning means when the sensed remaining quantity of insulative cap becomes less than a predetermined quantity.

Thus, because the operator can know with the warning that the remaining quantity of insulative caps in the cap holder becomes less than the predetermined quantity, he or she can appropriately supply the insulative caps in the cap holder without causing shortage of the insulative caps.

According to the seventeenth feature of the present invention, it is constituted to sense remaining quantity of insulative caps in the cap holder with the remaining quantity sensing means, and to stop with the stop means the operation of the rotary plate means when the sensed remaining quantity of insulative cap becomes less than a predetermined quantity.

Thus, because the operator can know with stopping of the operation of the rotary plate that the remaining quantity of insulative caps in the cap holder becomes less than the predetermined quantity, he or she can appropriately supply the insulative caps in the cap holder without causing shortage of the insulative caps.

According to the eighteenth feature of the present invention, it is constituted to comprise electrical insulation agent container provided on the upper cover and for containing electrical insulation agent, electrical insulation agent application means having a nozzle for applying the electrical insulation agent discharged from the electrical insulation agent container, a battery guide case inserted with the nozzle to contact a terminal of the battery, opened and closed by the upper cover, when the upper cover is closed, and having a battery container for containing the battery, rotary plate means a battery mounting section and a battery dropping hole on a rotary plate under the battery guide case, the battery mounting section being provided under the battery guide case at the side opposite to the upper cover, causing the terminal of the battery contained in the battery container to contact the nozzle, and contacting the terminal of the battery opposite to the nozzle side when the electrical insulation agent is applied on the terminals of battery from the nozzle for insulation, the battery dropping hole causing the battery contained in the battery container, battery receiving means provided under the rotary plate means at the side opposite to the upper cover, and for storing the battery dropped through the battery dropping hole of the rotary plate means, the terminals of the battery being insulated by the electrical insulation agent application means.

Thus, because the nozzle of the electrical insulation agent application means is put into contact with the terminal of the battery received in the battery container, and the electrical insulation agent can be applied on the terminal of the battery for insulation, it is possible not to cause short-circuiting even if the terminals of batteries contact each other while the insulated batteries are temporarily stored in the battery receiving means.

Accordingly, because heat can be prevented from generation due to contact of the terminals of the batteries, risks such as fire or burn can be prevented.

According to the nineteenth feature of the present invention, it is constituted that the electrical insulation agent application means partitions the electrical insulation agent container and the nozzle, and comprises a partition plate which has a groove for introducing the electrical insulation agent in the electrical insulation agent container to a nozzle container, a rotatable ball provided in a nozzle opening, and a compression spring pressing the ball provided on the partition plate.

Thus, the electrical insulation agent in the electrical insulation agent container can be introduced from the groove in the partition plate partitioning the electrical insulation agent container and the nozzle to the nozzle container, and the electrical insulation agent in the nozzle container attached on the ball can be applied on the terminal of the battery by rotating the ball rotatably provided on the nozzle opening contacting the terminal of the battery.

In addition, the electrical insulation agent flowing out through the gap between the ball and the nozzle opening caused by contact between the ball and the terminal of the battery can be applied on the terminal of the battery. Furthermore, when the ball is not put into contact with the terminal of the battery, the ball can close the nozzle opening with the pressing force of the compression spring provided on the partition plate so that the electrical insulation agent can be prevented from flowing outside.

According to the twentieth feature of the present invention, the rotary plate means is constituted to have rotary drive means for rotating and moving the rotary plate to a predetermined position so that the positions of the battery mounting section and the battery dropping hole can be varied.

Thus, because the positions of the battery mounting section and the battery dropping hole of the rotary plate can be suitably varied by rotating the rotary plate, when the terminal of the battery is insulated, the battery mounting section on the rotary plate can be automatically positioned at the position of the terminal of the battery received in the battery container opposite to the nozzle, and the battery dropping hole in the rotary plate can be automatically positioned at the position of the battery in the battery container after insulating the terminal of the battery.

According to the twenty-first feature of the present invention, the rotary plate means is constituted to rotate the rotary plate so that, when a terminal of the battery contained in the battery container is put into contact with the nozzle of the electrical insulation agent application means, the battery mounting section is at the terminal of the battery opposite to the nozzle side, and to rotate the rotary plate so that, after the terminal of the battery is insulated by applying the electrical insulation agent with the nozzle, the battery contained in the battery container is dropped in the battery receiving means, and the battery dropping hole is positioned at the position of battery contained in the battery container.

Thus, when the electrical insulation agent is applied on the terminal of the battery for insulation, the rotary plate can be rotated to bring the battery mounting section to the terminal of the battery opposite to the nozzle, and, after the terminal of the battery is insulated, the rotary plate can be rotated to bring the battery dropping hole to the position of the battery received in the battery container. Therefore, the rotary plate means can automatically and efficiently insulate the terminal of the battery, and drop the battery into the battery receiving means.

According to the twenty-second feature of the present invention, it is constituted that the rotary plate means is made the standby state by receiving the battery on the battery mounting section in the battery container, and closing the battery guide case with the upper cover to put the nozzle into contact with the terminal of the battery in the battery container, and operated by turning on a switch located on an operation panel of the apparatus.

Thus, the standby state cannot be attained if the upper cover is not closed, and the rotary plate cannot be rotated unless the switch is turned on so that the insulation of battery can be performed with a simple operation while assuring the safety.

According to the twenty-third feature of the present invention, the electrical insulation agent application means is constituted to rotate the ball provided in the nozzle opening by rotational movement of the rotary plate, the ball being put into contact with the terminal of the battery by rotational movement of the battery on the battery mounting section, applies the electrical insulation agent attached on the ball on the terminal of the battery contacting the ball, and to apply on the terminal of the battery the electrical insulation agent which flows out through a gap between the ball and the nozzle opening caused from the contact between the ball and the terminal of the battery.

Thus, the electrical insulation agent on the ball can be applied on the terminal of the battery by rotating the ball rotatably provided on the nozzle opening contacting the terminal of the battery, the ball being rotated through the rotational movement of the battery on the battery mounting section by rotating and moving the rotary plate through the rotational movement of the rotary plate. In addition, the electrical insulation agent flowing out through the gap between the ball and the nozzle opening caused by contact between the ball and the terminal of the battery can be applied on the terminal of the battery.

According to the twenty-fourth feature of the present invention, the flow rate of the electrical insulation agent from the electrical insulation agent container to the nozzle container is constituted to be controlled by air pressure on the liquid surface of the electrical insulation agent in the nozzle container. Thus, the stock of electrical insulation agent in the nozzle container can be controlled.

According to the twenty-fifth feature of the present invention, it is constituted to sense remaining amount of the electrical insulation agent in the electrical insulation agent container with the remaining amount sensing means, and to warn the operator with the warning means when the sensed remaining amount of the electrical insulation agent becomes less than a predetermined amount.

Thus, because the operator can know with the warning that the remaining amount of the electrical insulation agent in the electrical insulation agent container becomes less than the predetermined amount, he or she can appropriately supply the electrical insulation agent in the electrical insulation agent container without causing shortage of the electrical insulation agent.

According to the twenty-sixth feature of the present invention, it is constituted to sense remaining amount of the electrical insulation agent in the electrical insulation agent container with the remaining amount sensing means, and to stop with the stop means the operation of the rotary plate means when the sensed remaining amount of the electrical insulation agent becomes less than a predetermined amount.

Thus, because the operator can know with stopping of the operation of the rotary plate that the remaining amount of the electrical insulation agent in the electrical insulation agent container becomes less than the predetermined amount, he or she can appropriately supply the electrical insulation agent in the electrical insulation agent container without causing shortage of the electrical insulation agent.

Further objects and advantages of the present invention will be apparent from the following description of the preferred embodiments of the present invention as illustrated in the accompanying drawings.

DESCRIPTION OF THE PREFERRED EMBODIMENTS

Embodiments of the present invention will be explained in the following with reference to the drawings.

Figure 1:
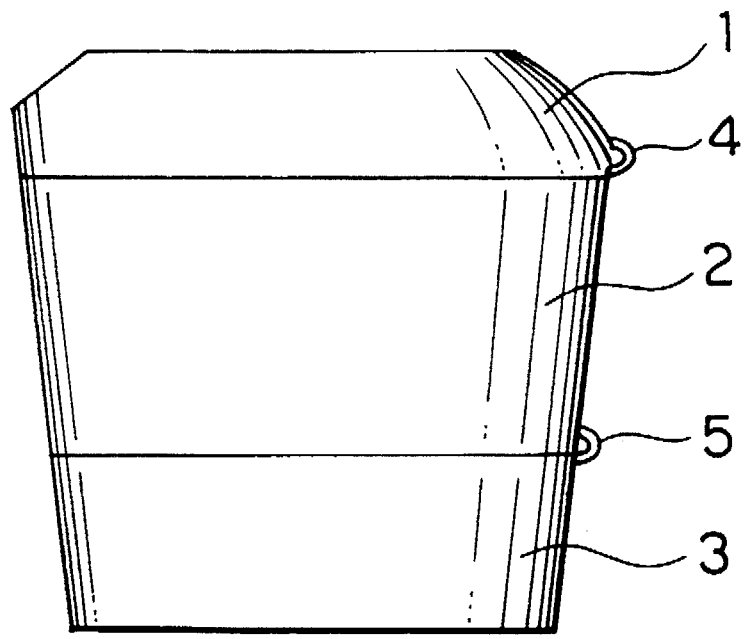
FIG. 1 is a front view illustrating the appearance of entire battery disposal and collection apparatus according to one embodiment of the present invention.
Figure 2:
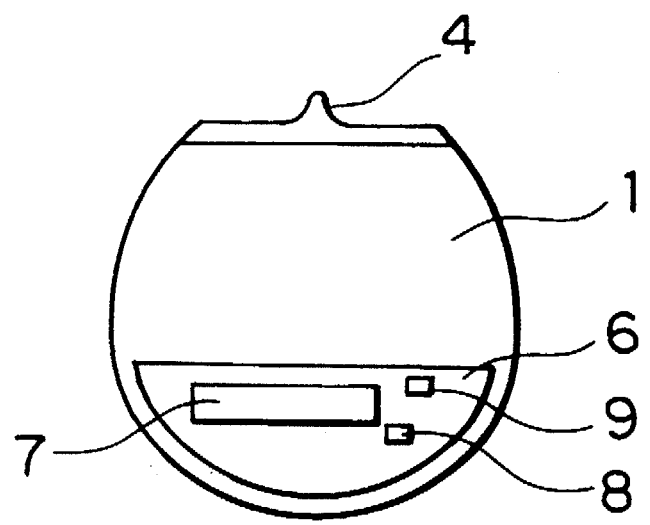
FIG. 2 is a plan view illustrating the appearance of entire battery disposal and collection apparatus according to one embodiment of the present invention.
Figure 3:
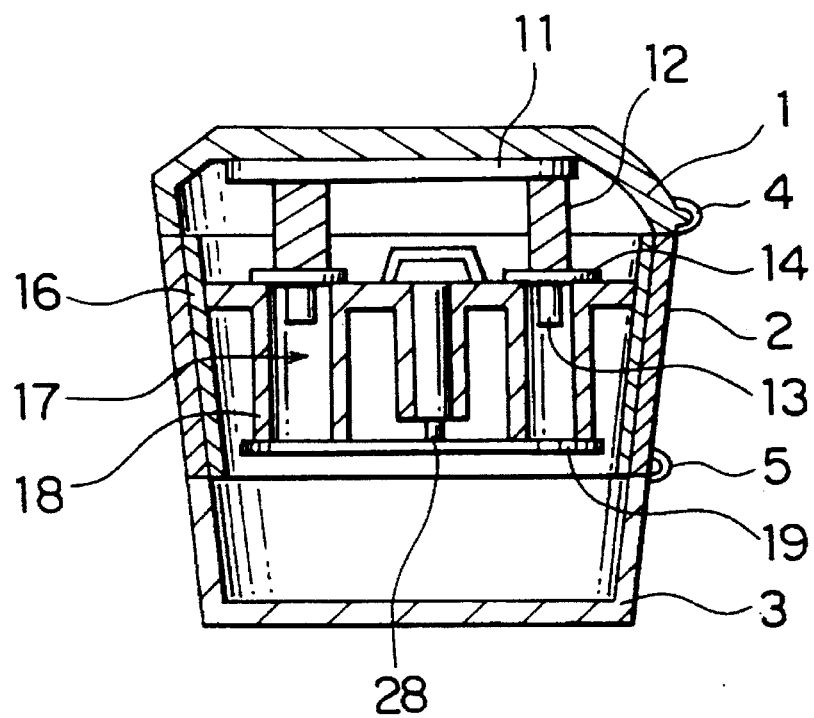
FIG. 3 is a sectional view illustrating the appearance of entire battery disposal and collection apparatus according to one embodiment of the present invention.
Figure 4:
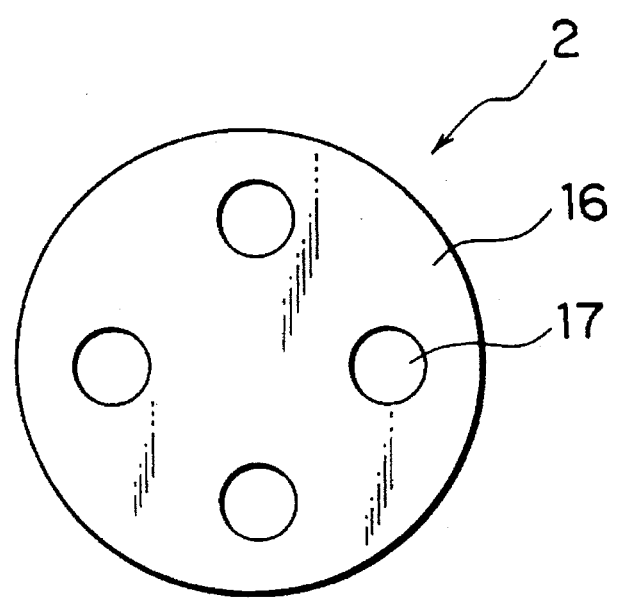
FIG. 4 is a plan view illustrating the arrangement of a battery disposal case of the battery disposal and collection apparatus shown in FIGS. 1–3.
Figure 5:
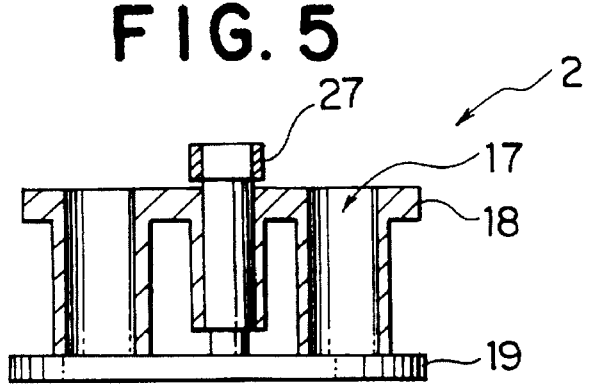
FIG. 5 is a sectional view illustrating the arrangement of a battery disposal case of the battery disposal and collection apparatus shown in FIGS. 1–3.
Figure 6:
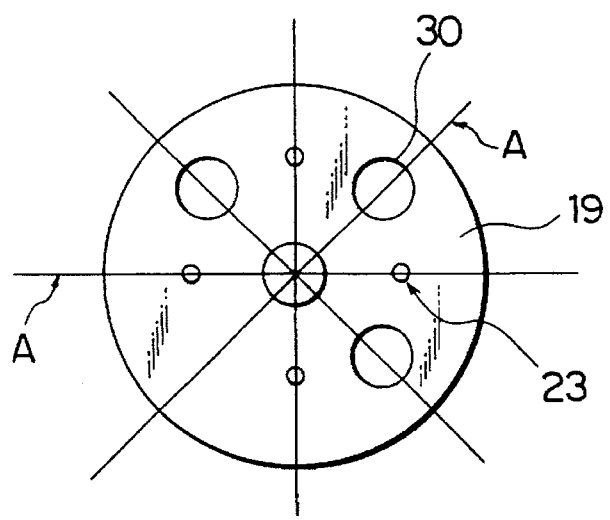
FIG. 6 is a plan view illustrating the arrangement of a rotary plate of the battery disposal and collection apparatus shown in FIGS. 1–3.
Figure 7:
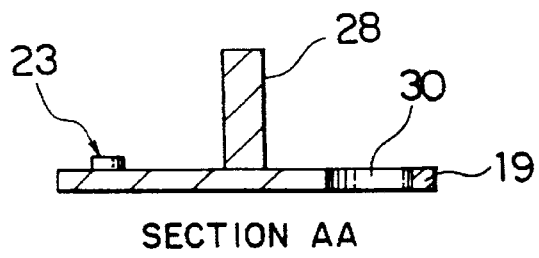
FIG. 7 is a sectional view illustrating the arrangement of a rotary plate of the battery disposal and collection apparatus shown in FIGS. 1–3.
Figure 8:
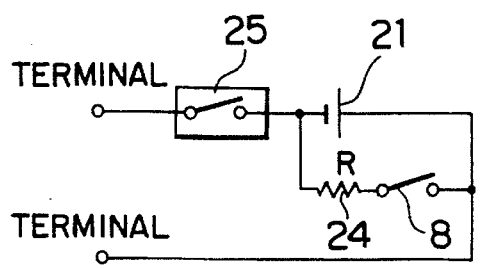
FIG. 8 is a circuit diagram illustrating the arrangement of a battery discharging circuit of the battery disposal and collection apparatus shown in FIGS. 1–3.
Figure 9:
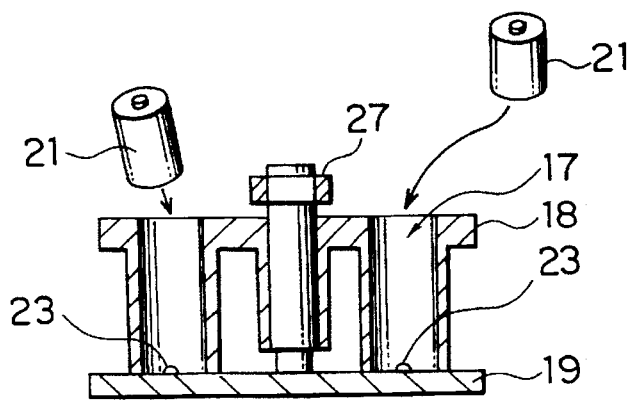
FIG. 9 is a state of a battery case and the rotary plate when batteries are set in the battery disposal case of the battery disposal and collection apparatus shown in FIGS. 1–3.
Figure 10:
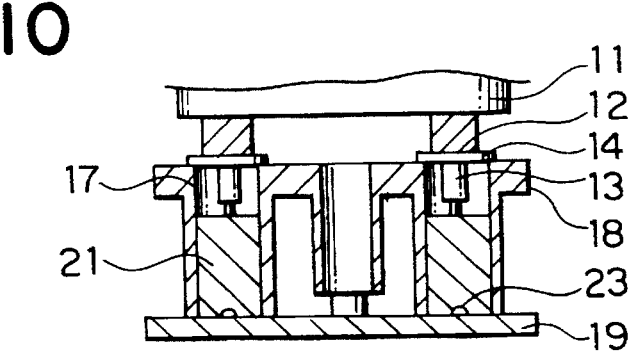
FIG. 10 is a state where the terminals of batteries are connected to the terminal connection when an upper cover is closed after the batteries are set in the battery disposal case of the battery disposal and collection apparatus shown in FIGS. 1–3.
Figure 11:
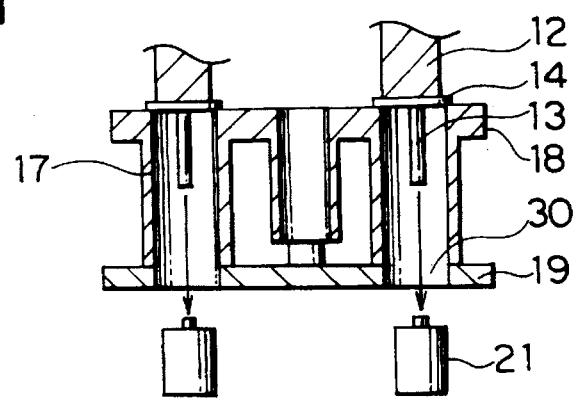
FIG. 11 is a state when the battery contacts are released and the batteries are dropped in the battery container after the batteries are discharged by the battery disposal and collection apparatus shown in FIGS. 1–3.

FIGS. 1–3 show the arrangement of a battery disposal and collection apparatus according to one embodiment of the present invention, in which FIG. 1 is a front view illustrating the appearance of entire battery disposal and collection apparatus, FIG. 2 is a plan view illustrating the appearance of entire battery disposal and collection apparatus, and FIG. 3 is a sectional view illustrating the appearance of entire battery disposal and collection apparatus. FIGS. 4 and 5 are a plan view and a sectional view illustrating the arrangement of a battery disposal case of the battery disposal and collection apparatus shown in FIGS. 1–3. FIGS. 6 and 7 are a plan view and a sectional view illustrating the arrangement of a rotary plate of the battery disposal and collection apparatus shown in FIGS. 1–3. FIG. 8 is a circuit diagram illustrating the arrangement of a battery discharging circuit of the battery disposal and collection apparatus shown in FIGS. 1–3. FIG. 9 is a state of a battery case and the rotary plate when batteries are set in the battery disposal case of the battery disposal and collection apparatus shown in FIGS. 1–3; FIG. 10 is a state where the terminals of batteries are connected to the terminal connection when an upper cover is closed after the batteries are set in the battery disposal case of the battery disposal and collection apparatus shown in FIGS. 1–3; and FIG. 11 is a state when the battery contacts are released and the batteries are dropped in the battery container after the batteries are discharged by the battery disposal and collection apparatus shown in FIGS. 1–3.

First, the arrangement is described. As shown in FIGS. 1 and 2, the battery disposal and collection apparatus of the embodiment roughly consists of an upper cover 1, a battery disposal case 2, and a battery container 3. The upper cover 1 can be closed and opened on the battery disposal case 2 with a hinge 4. The battery disposal case 2 can be also closed and opened on the battery container 3 with a hinge 5.

Although a simple arrangement for closing/opening respective components with the hinges 4 and 5 is shown in the figure, it is desirable to provide a lock mechanism for each component in view of safety when they are closed. Arranged on an operation panel 6 which is provided on the top of the upper cover 1 are an LCD panel 7 for displaying the operation guidance and the operation state, an operation switch (SW) 8, and an upper cover release button 9. It is preferable that the upper cover 1 is always closed except for when the battery disposal case 2 receives a battery in order to protect terminals or the like from contamination or corrosion by moisture or dirt from the atmosphere. While the upper cover 1 can be opened by pressing the upper cover release button 9, it is desirable by taking forgetting of closure into consideration that an upper cover closing mechanism is provided so that the upper cover is automatically closed after a predetermined time period expires.

In addition, it is desirable that a series of operations of the apparatus is systematized by providing an operation prohibit mechanism so that any operation cannot be performed even if the operation switch 8 or the like is operated unless the upper cover 1 is closed.

The arrangement of the entire battery disposal and collection apparatus is shown in FIGS. 3–5. Arranged on the inner plate on the top of the upper cover 1 comprises a drive unit 11, a compression spring 12, a guide plate 14 and a terminal electrode pin 13.

The battery disposal case 2 consists of a case body 16, a battery guide case 18 provided on the inside of the case body 16 and having battery receiving holes 17, and a rotary plate 19 provided on the bottom of the battery guide case 18 to cover the battery receiving holes 17, which will be described later in detail. The battery receiving hole 17 may be constructed to receive one D battery, two C batteries, or three AA batteries in one hole, or to receive one battery of respective type in respective hole 17.

Then, by actuating the compression spring 12 by closing the upper cover 1, the terminal electrode pin 13 can be varied for its position to the position where it can contact the battery 21 set in the battery receiving hole 17 of the battery guide case 18, and can hold a predetermined compressed condition.

Now, discharging of the battery is described. After the upper cover 1 is opened from the battery disposal case 2 around the hinge 4, as shown in FIG. 9, a used-up and unavailable battery 21 to be disposed is set in the battery receiving hole 17 of the battery guide case 18 arranged on the battery disposal case. Although the batteries 21 may be manually set in the battery receiving hole 17 by an operator one after another, it is desirable to automatically sort and set the various batteries by a battery sorter which sorts the batteries into respective types.

When the battery 21 is set in the battery receiving hole 17, electrode terminals 23 arranged on a plane on the rotary plate 19 disposed under the battery guide case 18 as shown in FIGS. 6, 7, 9, and 10 are positioned at a predetermined positions in the battery receiving holes 17 so that an electrode terminal 23 of the rotary plate 19 contacts one of the terminals of the battery 21. When, in this state, the upper cover 1 is put on the battery disposal case 2 and closed, as shown in FIG. 10, the terminal electrode pin 13 is guided and moved under the pressure of the compression spring 12 and by the guide plate 14 until it contacts the terminal of the battery 21 at the side opposite to the electrode terminal 23 of the rotary plate 19 so that each terminal of the battery 21 is connected.

Then, when the operation switch 8 on the operation panel 6 on the upper cover 1 is turned on, the drive unit 11 drives a battery discharging circuit shown in FIG. 8, causes the circuit to buffer short-circuit current flowing across the output terminals, and completes discharging.

Here, discharging duration of the battery 21 depends on the time constant of a resistance element 24. It may be possible to perform discharging by turning on a lamp. In addition, in view of effective utilization of discharged current, it is preferable to provide an operation switch 25 for accumulating the discharged current in a separate rechargeable battery (not shown connected to the terminal by turning on the operation switch 25.

After the battery discharging circuit completes discharging of the battery 21 received in the battery receiving hole 17, the rotary plate 19 is rotated and moved by a predetermined distance under the control of the drive unit 11 as a motor such as a stepping motor drives a worm gear 27 connected thereto which is in turn connected to the shaft 28 of the rotary plate 19.

Then, as the rotary plate 19 rotates to align a battery dropping hole 30 provided in the rotary plate 19 as shown in FIGS. 6 and 7 with the battery receiving hole 17 of the battery guide case 18, one of the terminals of the battery 21 is released from the electrode terminal 23 of the rotary plate 19, as shown in FIG. 11, and, because the terminal of the battery 21 on the battery guide case 18 is held by the battery guide case 18, the battery 21 is dropped into the battery container 3 through the battery dropping hole 30 in the rotary plate 19 by the pressing force of the battery guide case 18 or the like.

After the discharged battery 21 is dropped into the battery container 3 through the battery dropping hole 30, the electrode terminal 23 of the rotary plate 19 may be aligned again with the same predetermined position of the battery receiving hole 17 by rotating the rotary plate 19. However, because it is not favorable that defective contact easily occur due to wear when the terminal of the battery 21 continuously contacts the same position, the rotary plate 19 may be rotated so that different electrode terminal 23 aligns the predetermined position of the battery receiving hole 17.

The battery 21 contained in the battery container 3 may be arranged to be received and packed in a vinyl bag previously prepared in the battery container 3, or to be sorted and received by a battery sorting container additionally provided in the battery container 3.

As described, according to this embodiment, it is constituted to set the battery 21 to be disposed in the battery receiving hole 17 of the battery guide case 18, to discharge the battery 21 by the discharging circuit, and then to receive and store the discharged battery 21 in the battery container 3 through the battery dropping hole 30 in the rotary plate 19. Thus, by the time when the collection company collects the batteries, the electric energy in the battery 21 can be made substantially zero so that heat generation can be prevented even if the terminals of batteries 21 contact each other.

Thus, risks such as fire or burn due to heat generation from the battery 21 can be prevented so that stability of the battery 21 when it is disposed can be improved. Accordingly, the embodiment can significantly contribute to safety measures in temporary storage until disassembly and in disassembly by the expert company, and high safety can be also expected in gathering during collection so that it can significantly contribute in promoting disposal and recycling, and an education movement can be widely developed.

In addition, the embodiment is arranged to discharge the battery 21 with the discharging circuit shown in FIG. 8 so that discharging can be gradually performed rather than quickly by suitably adjusting the time constant of the resistance element 24. Therefore, discharging can be stably performed by gradually converting thermal energy while suppressing the heat applied on the output terminal.

While the above embodiment is described for a case where the discharged battery 21 is temporarily stored in the battery container 3 before disposal, it may be arranged to apply electrical insulator such as Si on at least one of the terminals of discharged battery 21, or shield it with a cap, vinyl sheet or the like. In addition, the entire battery 21 may be covered and shielded by vinyl sheet or the like.

In these cases, even if electric energy remains in the discharged battery 21, short-circuit between the terminals of the battery 21 may be further efficiently prevented.

Figure 12:
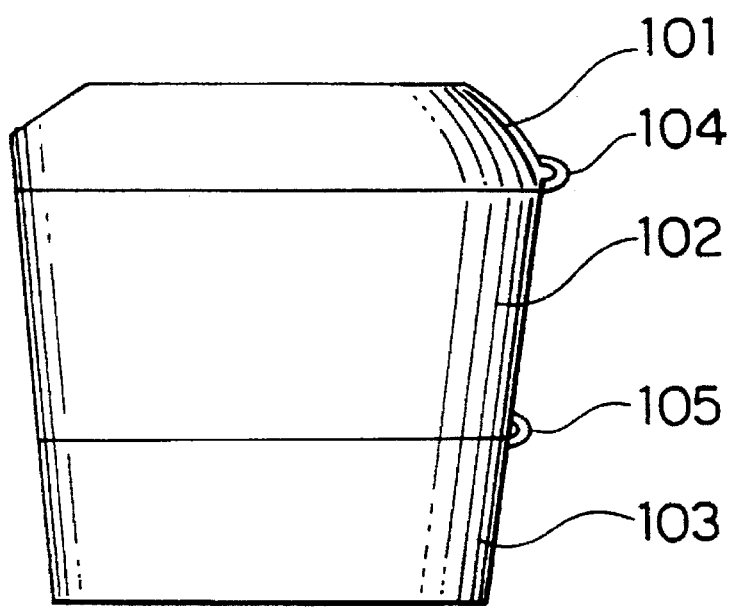
FIG. 12 is a front view illustrating the appearance of entire battery disposal and collection apparatus according to another embodiment of the present invention.
Figure 13:
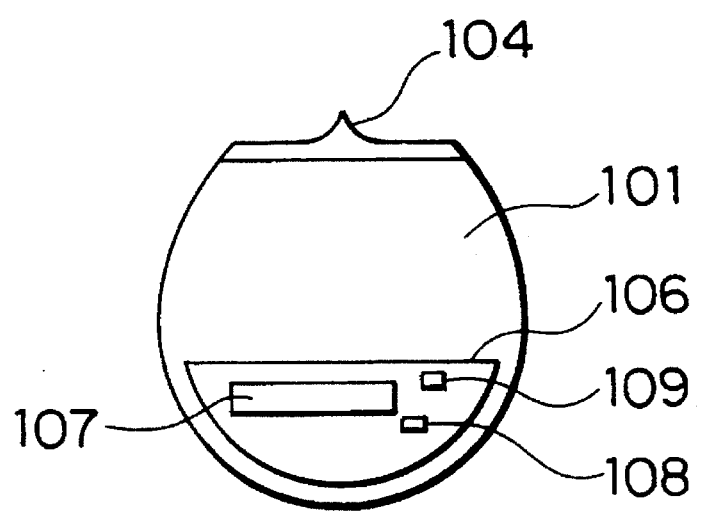
FIG. 13 is a plan view illustrating the appearance of entire battery disposal and collection apparatus according to another embodiment of the present invention.
Figure 14:
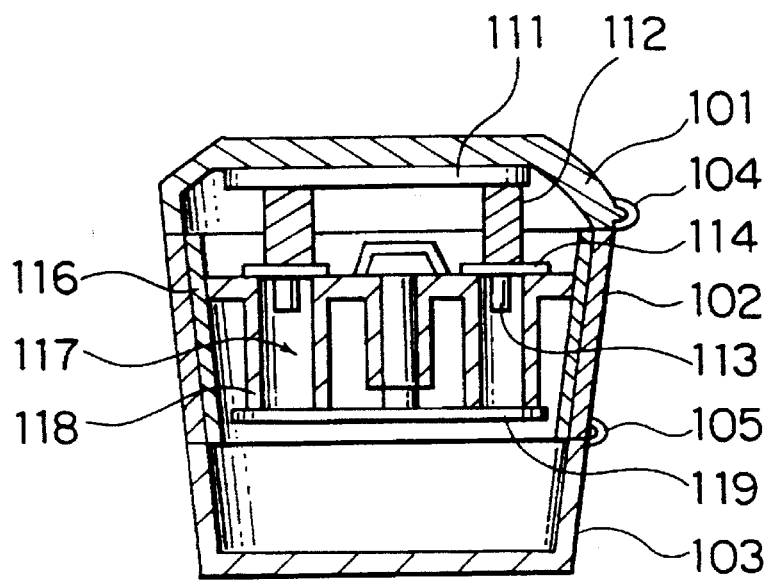
FIG. 14 is a sectional view illustrating the appearance of entire battery disposal and collection apparatus according to another embodiment of the present invention.
Figure 15:
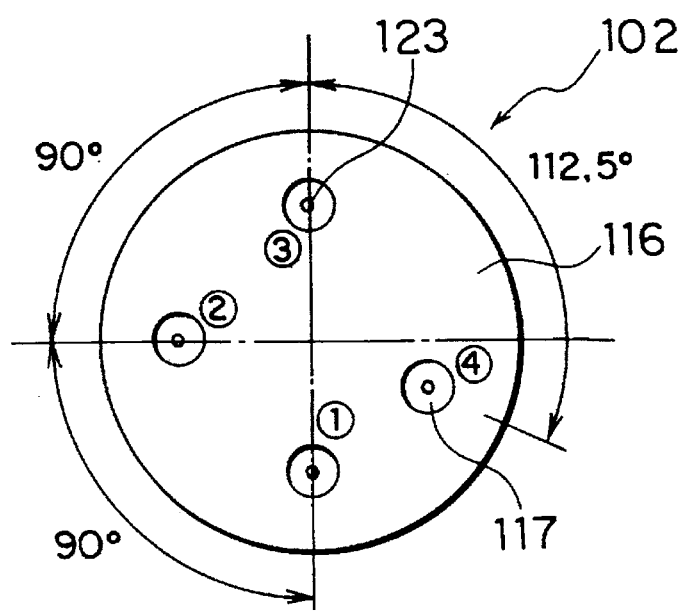
FIG. 15 is a plan view illustrating the arrangement of a battery disposal case of the battery disposal and collection apparatus shown in FIGS. 12–14.
Figure 16:
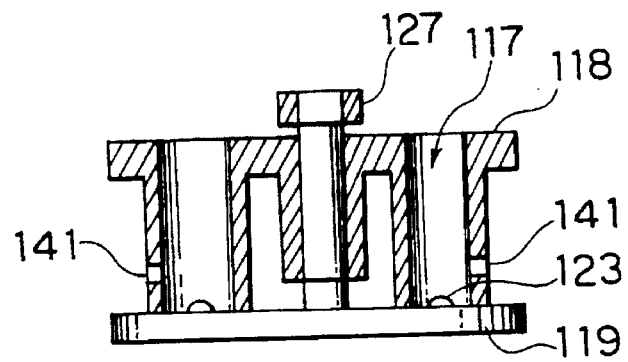
FIG. 16 is a sectional view illustrating the arrangement of a battery disposal case of the battery disposal and collection apparatus shown in FIGS. 12–14.
Figure 17:
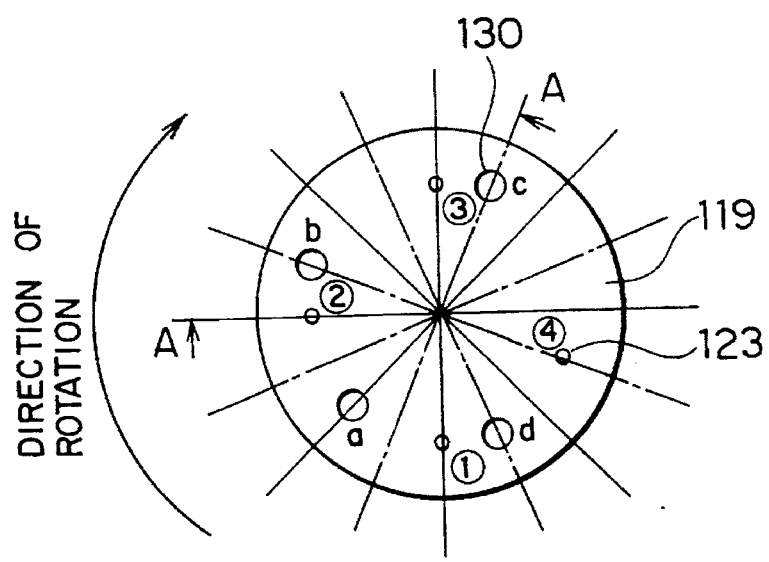
FIG. 17 is a plan view illustrating the arrangement of a rotary plate of the battery disposal and collection apparatus shown in FIGS. 12–14.
Figure 18:
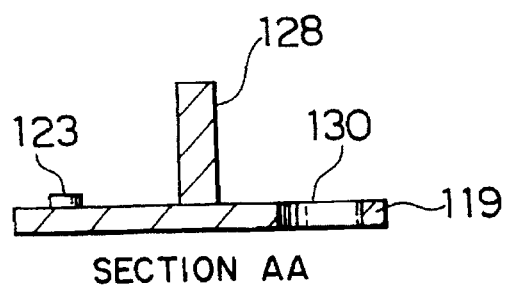
FIG. 18 is a sectional view illustrating the arrangement of a rotary plate of the battery disposal and collection apparatus shown in FIGS. 12–14.
Figure 19:
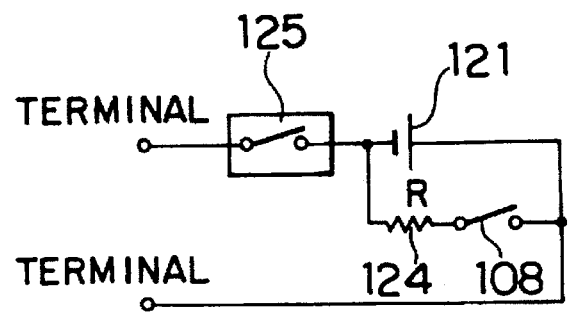
FIG. 19 is a circuit diagram illustrating the arrangement of a battery discharging circuit of the battery disposal and collection apparatus shown in FIGS. 12–14.

FIGS. 12–14 show the arrangement of a battery disposal and collection apparatus according to another embodiment of the present invention. FIG. 12 is a front view illustrating the appearance of entire battery disposal and collection apparatus, FIG. 13 is a plan view illustrating the appearance of entire battery disposal and collection apparatus, and FIG. 14 is a sectional view illustrating the appearance of entire battery disposal and collection apparatus. FIGS. 15 and 16 are a plan view and a sectional view illustrating the arrangement of a battery disposal case of the battery disposal and collection apparatus shown in FIGS. 12–14. FIGS. 17 and 18 are a plan view and a sectional view illustrating the arrangement of a rotary plate of the battery disposal and collection apparatus shown in FIGS. 12–14. FIG. 19 is a circuit diagram illustrating the arrangement of a battery discharging circuit of the battery disposal and collection apparatus shown in FIGS. 12–14.

Figure 20:
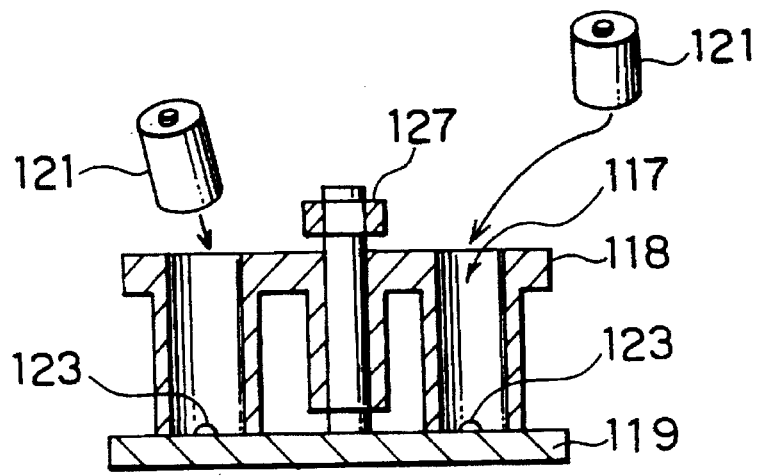
FIG. 20 is a state of a battery guide case and the rotary plate when batteries are set in the battery disposal case of the battery disposal and collection apparatus shown in FIGS. 12–14.
Figure 22:
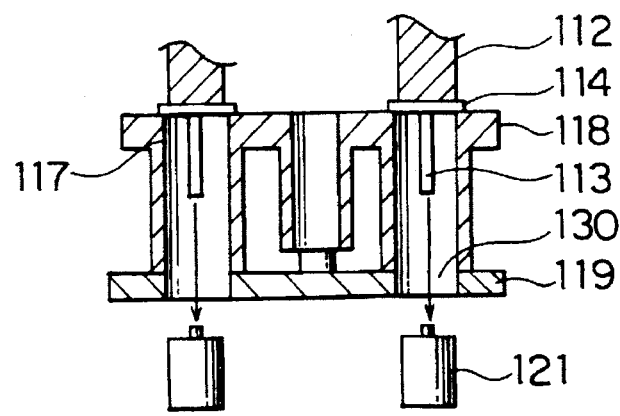
FIG. 22 is a state when the battery contacts are released and the batteries are dropped in the battery container after the batteries are discharged by the battery disposal and collection apparatus shown in FIGS. 12–14.
Figure 23:
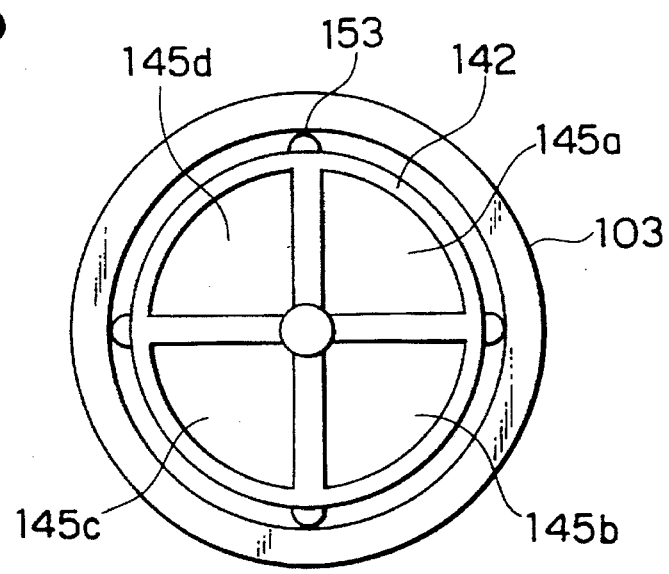
FIG. 23 is a plan view illustrating the arrangement of a battery container.
Figure 24:
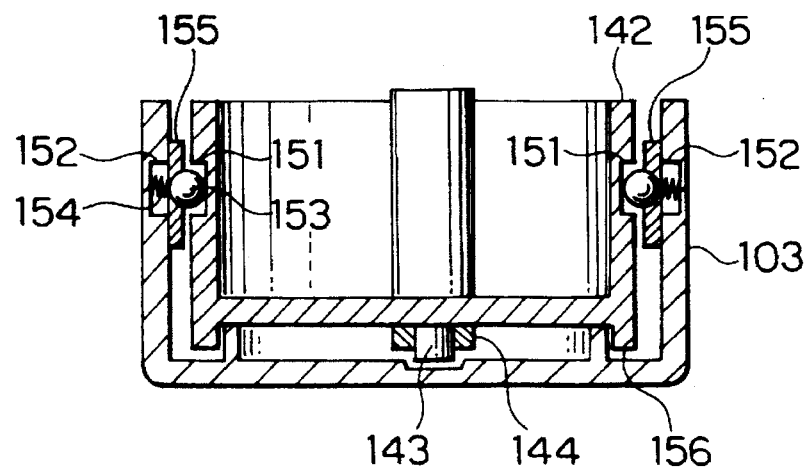
FIG. 24 is a sectional view illustrating the arrangement of a battery container.

FIG. 20 is a state of a battery guide case and the rotary plate when batteries are set in the battery disposal case of the battery disposal and collection apparatus shown in FIGS. 12–14, FIG. 21 is a state where the terminals of batteries are connected to the terminal connection when an upper cover is closed after the batteries are set in the battery disposal case of the battery disposal and collection apparatus shown in FIGS. 12–14, FIG. 22 is a state when the battery contacts are released and the batteries are dropped in the battery container after the batteries are discharged by the battery disposal and collection apparatus shown in FIGS. 12–14, FIG. 23 is a plan view illustrating the arrangement of a battery container, FIG. 24 is a sectional view illustrating the arrangement of a battery container.

First, the arrangement is described. As shown in FIGS. 12 and 13, the battery disposal and collection apparatus of the embodiment roughly consists of an upper cover 101, a battery disposal case 102, and a battery container 103. The upper cover 101 can be closed and opened on the battery disposal case 102 with a hinge 104. The battery disposal case 102 can be also closed and opened on the battery container 103 with a hinge 105.

A simple arrangement for closing/opening respective components with the hinges 104 and 105 may be employed here, but it may provide a lock mechanism for each component in view of safety when they are closed. Arranged on an operation panel 106 which is provided on the top of the upper cover 101 are an LCD panel 107 for displaying the operation guidance and the operation state, an operation switch (SW) 108, and an upper cover release button 109.

It is preferable that the upper cover 101 is always closed except for when the battery disposal case 102 receives a battery in order to protect terminals or the like from contamination or corrosion by moisture or dirt from the atmosphere. While the upper cover 101 can be opened by pressing the upper cover release button 109, it is desirable by taking forgetting of closure into consideration that an upper cover closing mechanism is provided so that the upper cover is automatically closed after a predetermined time period expires.

In addition, it is desirable that a series of operations of the apparatus is systematized by providing an operation prohibit mechanism so that any operation cannot be performed even if the operation switch 108 or the like is operated unless the upper cover 101 is closed.

The arrangement of the entire battery disposal and collection apparatus is shown in FIGS. 14–16. Arranged on the inner plate on the top of the upper cover 101 is a drive unit 111 to which a compression spring 112 operated by the drive unit 111 is connected. The compression spring 112 is connected to a terminal electrode pin 113 actuated by the compression spring 112. A guide plate 114 is connected between the compression spring 112 and the terminal electrode pin 113.

The battery disposal case 102 consists of a case body 116, a battery guide case 118 provided on the inside of the case body 116 and having battery receiving holes 117, and a rotary plate 119 provided on the bottom of the battery guide case 118 to cover the battery receiving holes 117.

Then, by actuating the compression spring 112 by closing the upper cover 101, the terminal electrode pin 113 can be varied for its position to the position where it can contact the terminal of the battery 121 set in the battery receiving hole 117 of the battery guide case 118, and can hold a predetermined compressed condition.

Now, discharging of the battery is described. After the upper cover 101 is opened from the battery disposal case 102 around the hinge 104, as shown in FIG. 20, a used-up and unavailable battery 121 to be disposed is set in the battery receiving hole 117 of the battery guide case 118 arranged on the battery disposal case 102. The battery 121 is previously marked with an identification mark on its surface for identifying the type of battery such as a lithium battery, manganese battery, NiCd secondary battery, or hydride battery. Although the batteries 121 may be manually set in the battery receiving hole 117 by an operator one after another, it is desirable to automatically sort and set the various batteries by a battery sorter which sorts the batteries into respective types.

Figure 21:
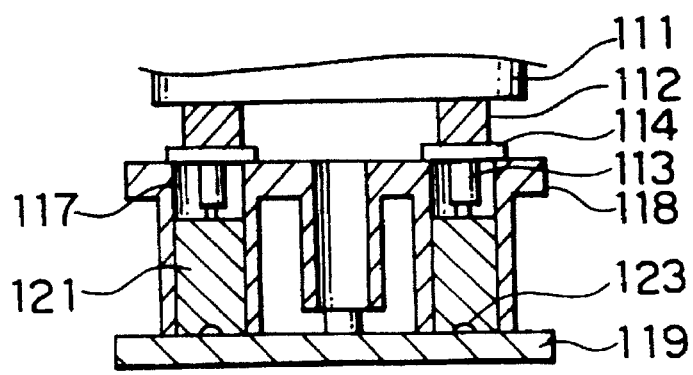
FIG. 21 is a state where the terminals of batteries are connected to the terminal connection when an upper cover is closed after the batteries are set in the battery disposal case of the battery disposal and collection apparatus shown in FIGS. 12–14.

When the battery 121 is set in the battery receiving hole 117, electrode terminals 123 arranged on a plane on the rotary plate 119 disposed under the battery guide case 118 as shown in FIGS. 17, 18, 20, and 21 are positioned at a predetermined positions in the battery receiving holes 117 so that an electrode terminal 123 of the rotary plate 119 contacts one of the terminals of the battery 121. When, in this state, the upper cover 101 is put on the battery disposal case 102 and closed, as shown in FIG. 21, the terminal electrode pin 113 is guided and moved under the pressure of the compression spring 112 and by the guide plate 114 until it contacts the terminal of the battery 121 at the side opposite to the electrode terminal 123 of the rotary plate 119 so that the terminals of the battery 121 are connected to the electrode terminal 123 and the terminal electrode pin 113, respectively.

Then, when the operation switch 108 on the operation panel 106 on the upper cover 101 is turned on, the drive unit 111 drives a battery discharging circuit shown in FIG. 19, causes the circuit to buffer short-circuit current flowing across the output terminals, and completes discharging.

Here, discharging duration of the battery 121 depends on the time constant of a resistance element 124. It may be possible to perform discharging by turning on a lamp. In addition, in view of effective utilization of discharged current, it is preferable to provide an operation switch 125 for accumulating the discharged current in a separate rechargeable battery (not shown) connected to the terminal by turning on the operation switch 125.

Now, the separation of the battery 121 is described.

As shown in FIG. 16, a battery separation sensor 141 is provided on a part of the battery guide case 118 for identifying the type of battery 121 based on the identification mark marked on the battery 121. The battery separation sensor 141 identifies and determines the type of battery 121 with the identification mark on the battery 121 set and discharged in the battery receiving hole 117 or the color of the battery 121. Thereafter, a drive unit (not shown) controls a stepper motor drive (not shown) or the like to couple the driving force to a battery separation case 142, and gears 144 for a rotation shaft 143 as shown in FIGS. 23 and 24 thereby moving one of dedicated cases 145a–145d of the battery separation case 142 specified in correspondence to the identified type of battery 121 just under the battery 121.

Although the battery separation case 142 is divided into four dedicated cases 145a–145d, the number of division may be any number. Here, the dedicated case 145a is a case dedicated for lithium batteries, the dedicated case 145b is a case dedicated for manganese batteries, the dedicated case 145c is a case dedicated for NiCd secondary batteries or hydride batteries, and the dedicated case 145d is a case dedicated for other batteries.

It is desirable to provide a vinyl bag or the like for respective dedicated cases 145a–145d by considering efficiency in transport, disposal and recycling after the battery 121 is stored in the battery separation case 142.

As described earlier, when the battery separation sensor 141 identifies the type of battery 121, a drive control circuit (not shown) performs mechanical control to provide stepwise motion to a stepper motor (not shown) which is interlocked to the gear 144 of the battery separation case 142 to rotate the battery separation case 142 thereby moving the storage case 145a–145d corresponding to the type of battery 121 just under the battery 121 identified for its type. At the moment, the storage case is rotated by the driving force interlocked with the gear 144 of the battery separation case 142, and moved to the specified position as described.

The battery separation case 142 is provided with, as shown in FIGS. 23 and 24, a ball guide groove 151 in the circumference of its outer side for smooth rotation. A groove 152 is formed opposite to the ball guide groove 151 in the circumference of the inner side of the battery container 103. The groove 152 has a compression spring 154 for outwardly urging the ball 153 set therein. The ball 153 is held by a ball stopping plate 155.

Thus, the ball 153 can rotate in contact with the battery separation case 142 under a certain constant pressure so that the battery separation case 142 can be smoothly rotated. A guide 156 provided on the bottom plate of the battery container 103 supports the battery separation case 142.

The battery receiving holes 117 of the case body 116 are arranged as shown in FIG. 15. Their locations are interrelated to the rotary plate 119. For example, they are located with an angle of 90° for (1)–(2) on the rotary plate 119, with an angle of 90° for (2)–(3) on the rotary plate 119, and with an angle of 112.5° for (3)–(4) on the rotary plate 119. The rotary plate 119 consists of, as shown in FIG. 17, electrode terminals 123 and battery dropping holes 130.

The rotary plate 119 arranged with electrode terminals 123 as in the similar manner to the battery receiving holes 117, for example, as (1)–(4). The battery dropping holes 130 are arranged in such a manner the first battery dropping hole (a) 130 is at a location with an angle of 45° from (1) of the electrode terminal 123, the battery dropping hole (b) 130 at a location with an angle of 22.5° from (2) of the electrode terminal 123, the battery dropping hole (c) 130 at a location with an angle 22.5° from (3) of the electrode terminal 123, the battery dropping hole (d) 130 at a location with an angle of minus 22.5° from (1) of the electrode terminal 123. The principle of operation is as follows.

When the operation is started after setting the battery 121 to be disposed in the battery receiving hole 117 of the battery guide case 118, the battery 121 is first discharged, and identified. The dedicated cases 145a–145d of the battery separation case 142 are rotated on drive circuit to the specified position on which the battery 121 drops. This may be performed simultaneously with the rotation of the rotary plate 119. Although the battery 121 is identified after discharging, discharging may be performed after identification of the battery 121.

Then, the battery 121 on the electrode terminal (1) 123 on the rotary plate 119 is dropped into the specified position in the battery separation case 142 through the battery dropping hole (d) 130 by one step of rotation of the rotary plate 119 (22.5° in the angle). Subsequently, the battery 121 on the electrode terminal (2) 123 is rotated by two steps (45° in the angle) to the battery dropping hole (a) 130, and dropped in the dedicated case 145a–145d at the specified position as the battery separation case 142 is moved.

The battery 121 on the battery mounting section 123 at (3) is dropped into the dedicated case 145a–145d of the battery separation case 142 at the specified position as the battery dropping hole (b) 130 rotates by three steps (67.5° in the angle) with the rotation of the battery separation case 142. The battery 121 on the electrode terminal (4) 123 is similarly dropped as the battery dropping hole (c) 130 rotates by four steps (90° in the angle), which completes the cycle.

Linking with these dropping operation into the holes, the battery separation case 142 of the battery container 103 is moved as the dedicated cases 145a–145d are rotated to the specified positions, and drops the battery 121 depending on its type through the battery dropping holes 30 for storage.

Here, the operation for dropping the battery 121 into the battery container 103 by actuating the rotary plate 119 is described. The rotary plate 119 is rotated and moved by a predetermined distance under the control of the drive unit 111 as a motor such as a stepping motor drives a worm gear 127 connected thereto which is in turn connected to the shaft 128 of the rotary plate 119.

Then, as the rotary plate 119 rotates to align a battery dropping hole 130 provided in the rotary plate 119 as shown in FIGS. 17 and 18 with the battery receiving hole 117 of the battery guide case 118, one of the terminals of the battery 121 is released from the electrode terminal 123 of the rotary plate 119, as shown in FIG. 22, and, because the terminal of the battery 121 on the battery guide case 118 is held by the battery guide case 118, the battery 121 is dropped into the battery container 103 through the battery dropping hole 130 in the rotary plate 119 by the pressing force of the battery guide case 118 or the like.

After the battery 121 is dropped into the battery container 103 through the battery dropping hole 130, the electrode terminal 123 of the rotary plate 119 may be aligned again with the same predetermined position of the battery receiving hole 117 by rotating the rotary plate 119. However, because it is not favorable that defective contact easily occur due to wear when the terminal of the battery 121 continuously contacts the same position, the rotary plate 119 may be rotated so that different electrode terminal 123 aligns the predetermined position of the battery receiving hole 117.

As described, the embodiment according to the seventh feature is constituted in such a manner that the terminals of the battery 121 received in the battery receiving hole 117 are put into contact with the terminal electrode pin 113 of and the output terminal of the electrode terminal 123, the battery 121 being completely discharged through the output terminal.

Thus, it is possible not to cause short-circuiting even if the terminals of batteries 121 contact each other while the discharged batteries 121 are temporarily stored in the battery container 103. Accordingly, because heat can be prevented from generation due to contact of the terminals of the batteries 121, risks such as fire or burn can be prevented.

In addition, the embodiment according to the seventh feature is constituted in such a manner that the type of battery 121 is identified based on the identification mark for identifying the type of battery 121 provided on the battery 121 received in the battery receiving hole 117, and the battery 121 is separated by receiving the battery 121 in the battery container 103 based on the identified type of battery 121. Thus, because the batteries 121 can be received in the battery container 103 by the type of battery 121 for separation, disposal and recycling suitable for respective types of battery 121 can be performed.

The embodiment according to the eighth feature is constituted to rotate and move the battery separation case 142 to a predetermined position.

Thus, the battery 121 identified for its type in the battery guide case 118 can be efficiently received in a predetermined position in the battery separation case 142 through the battery dropping hole 130 in the rotary plate 119 by rotatably moving the battery separation case 142.

The embodiment according to the ninth feature is constituted in such a manner that the rotary plate 119 is rotated so that, when a terminal of the battery 121 received in the battery receiving hole 117 is put into contact with the terminal electrode pin 113, the electrode terminal 123 is put into contact with the terminal of the battery 121 opposite to that contacting the terminal electrode pin 113, after the battery 121 is discharged, the type of battery 121 is identified, the battery separation case 142 is rotated to a predetermined position so as to receive the battery 121 in the battery separation case 142 corresponding to the identified type of battery 121, and the rotary plate 119 is rotated so that the battery dropping hole 130 is positioned at the position of the battery 121 received in the battery receiving hole 117 to drop the battery 121 in the battery separation case 142 corresponding to the identified type of battery 121.

Thus, it is possible automatically and efficiently perform contact between the terminal of the battery 121 received in the battery receiving hole 117 and the electrode terminal 123 of the rotary plate 119, and dropping of the battery 121 completed for discharging and identification received in the battery receiving hole 117 into the battery container 103. In addition, it is also possible to automatically and efficiently position the battery guide case 118 and the battery separation case 142 so that the battery 121 completed for discharging and identification received in the battery receiving hole 117 is contained in the battery separation case 142 corresponding to the identified type of battery 121.

The embodiment according to the tenth feature is constituted in such a manner that the battery separation case 142 has the dedicated battery cases 145a–145d divided into four, the rotation shaft 143 and the gears 144 being arranged at the center of case, the case body being supported by a guide 156, the ball guide groove 151 being arranged in the circumferential direction on the outer side of the case, the groove 152 opposite to the ball guide groove 151 being provided in the battery container 103, a bearing arranged with the ball 153, the compression spring 154, and the ball stopping plate 155 being constituted in the grooves 151 and 152.

Thus, the battery separation case 142 be easily and smoothly rotated and moved.

Although the above embodiments are described for a case where the battery guide case 118 provided on the rotary plate 119 is fixed, and the battery separation case 142 and the rotary plate 119 mounted below the rotary plate 119 are rotated and moved based on the result of identification of the type of battery 121 received in the battery receiving hole 117 in the battery guide case 118 thereby receiving the battery 121 in the dedicated case 145a–145d of the battery separation case 142 by the type of battery 121 for separation of batteries, the present invention is not limited to such case, but may be constituted in such a manner that the rotary plate 119 is fixed, and the battery guide case 118 and the rotary plate 119 are rotated and moved for separation of the battery 121, or that the battery guide case 118, the rotary plate 119, and the battery separation case 142 are rotated and moved for separation of the battery 121.

Figure 25:
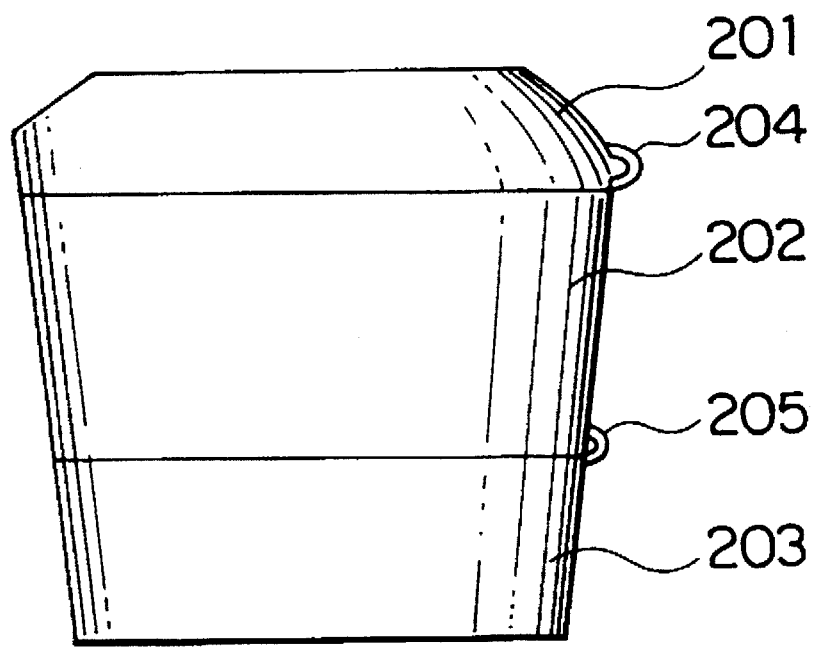
FIG. 25 is a front view illustrating the appearance of entire battery disposal and collection apparatus according to still another embodiment of the present invention.
Figure 26:
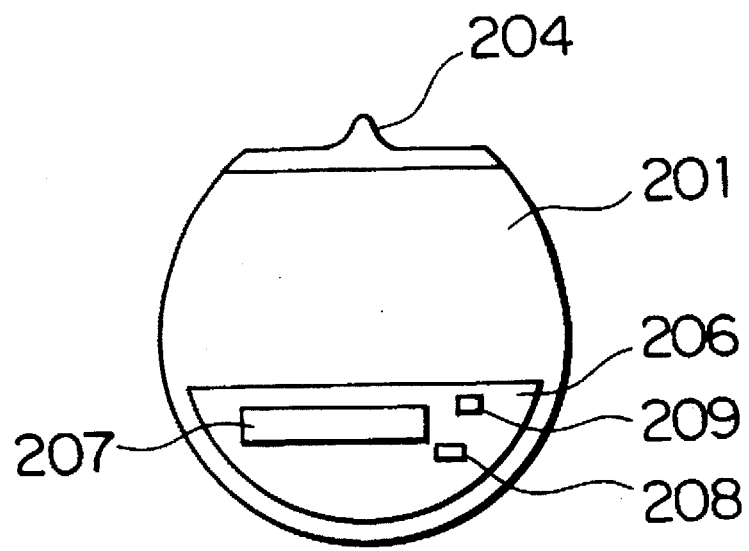
FIG. 26 is a plan view illustrating the appearance of the entire battery disposal and collection apparatus shown in FIG. 25.
Figure 27:
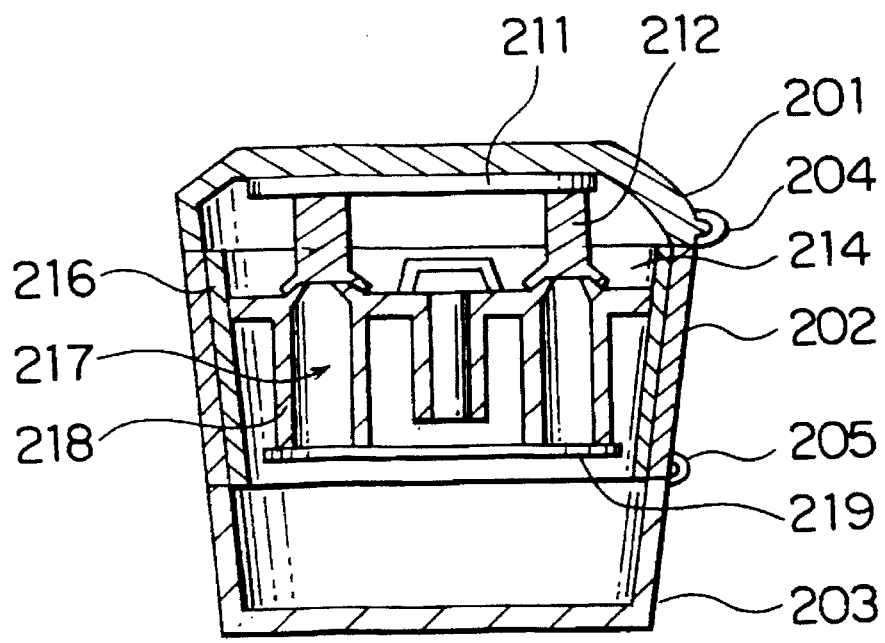
FIG. 27 is a sectional view illustrating the arrangement of the entire battery disposal and collection apparatus shown in FIGS. 25 and 26.

FIGS. 25–27 show the arrangement of a battery disposal and collection apparatus according to still another embodiment of the present invention. FIG. 25 is a front view illustrating the appearance of entire battery disposal and collection apparatus, FIG. 26 is a plan view illustrating the appearance of the entire battery disposal and collection apparatus shown in FIG. 25, FIG. 27 is a sectional view illustrating the appearance of the entire battery disposal and collection apparatus shown in FIGS. 25 and 26, FIGS. 28 and 29 are a plan view and a sectional view illustrating the arrangement of a battery disposal case of the battery disposal and collection apparatus shown in FIGS. 25–27, FIGS. 30 and 31 are a plan view and sectional view illustrating the arrangement of a rotary plate of the battery disposal and collection apparatus shown in FIGS. 25–27, and FIGS. 32–34 are procedure for mounting a cap on a terminal of a battery by a cap mounting unit of the battery disposal and collection apparatus shown in FIGS. 25–27.

Figure 35:
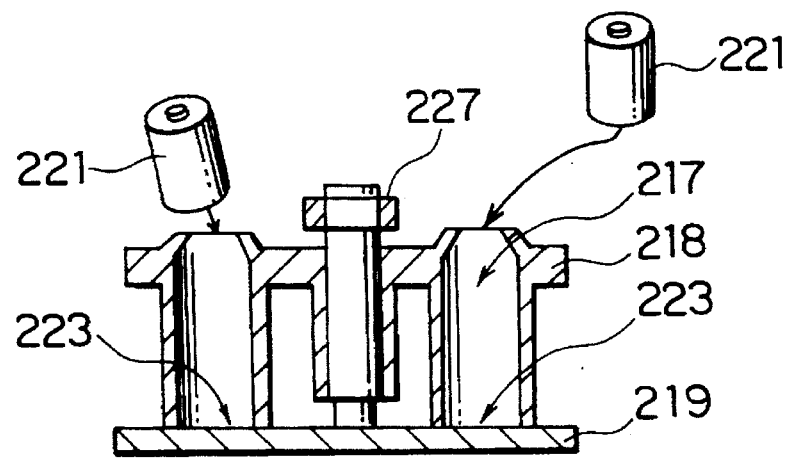
FIG. 35 is a state of a battery guide case and the rotary plate when batteries are set in the battery disposal case of the battery disposal and collection apparatus shown in FIGS. 25–27.

FIG. 35 is a state of a battery guide case and the rotary plate when batteries are set in the battery disposal case of the battery disposal and collection apparatus shown in FIGS. 25–27, FIG. 36 is a state where the terminals of batteries are connected to the terminal connection when an upper cover is closed after the batteries are set in the battery disposal case of the battery disposal and collection apparatus shown in FIGS. 25–27, and FIG. 37 is a state when the battery contacts are released and the batteries are dropped in the battery container after the batteries are insulated by mounting the cap on the terminal of the battery with the battery disposal and collection apparatus shown in FIGS. 25–27.

First, the arrangement is described. As shown in FIGS. 25 and 26, the battery disposal and collection apparatus of the embodiment roughly consists of an upper cover 201, a battery disposal case 202, and a battery container 203. The upper cover 201 can be closed and opened on the battery disposal case 202 with a hinge 204. The battery disposal case 202 can be also closed and opened on the battery container 203 with a hinge 205.

A simple arrangement for closing/opening respective components with the hinges 204 and 205 may be employed here, but it is desirable to provide a lock mechanism for each component in view of safety when they are closed. Arranged on an operation panel 206 which is provided on the top of the upper cover 201 are an LCD panel 207 for displaying the operation guidance and the operation state, an operation switch (SW) 208, and an upper cover release button 209.

It is preferable that the upper cover 201 is always closed except for when it receives a battery in the battery disposal case 202 in order to protect terminals or the like from contamination or corrosion by moisture or dirt from the atmosphere. While the upper cover 201 can be opened by pressing the upper cover release button 209, it is possible by taking forgetting of closure into consideration that an upper cover closing mechanism is provided so that the upper cover is automatically closed after a predetermined time period expires.

In addition, it is desirable that a series of operations of the apparatus is systematized by providing an operation prohibit mechanism so that any operation cannot be performed even if the operation switch 208 or the like is operated unless the upper cover 201 is closed.

Figure 28:
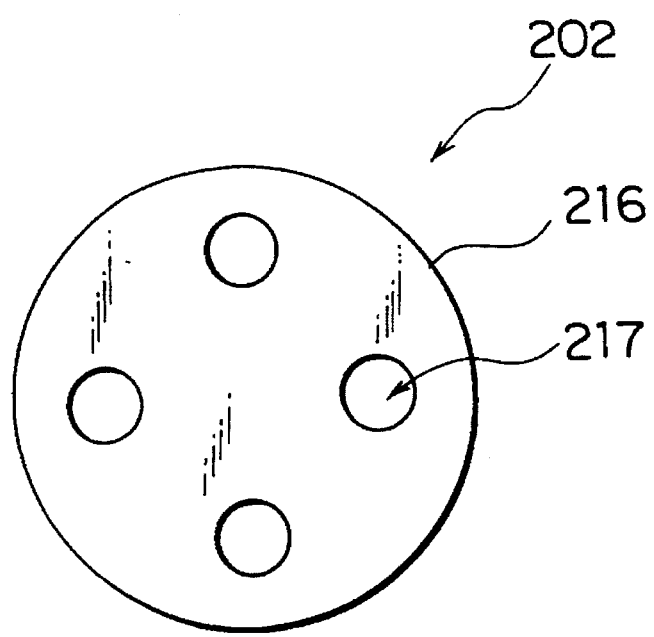
FIG. 28 is a plan view illustrating the arrangement of a battery disposal case of the battery disposal and collection apparatus shown in FIGS. 25–27.
Figure 29:
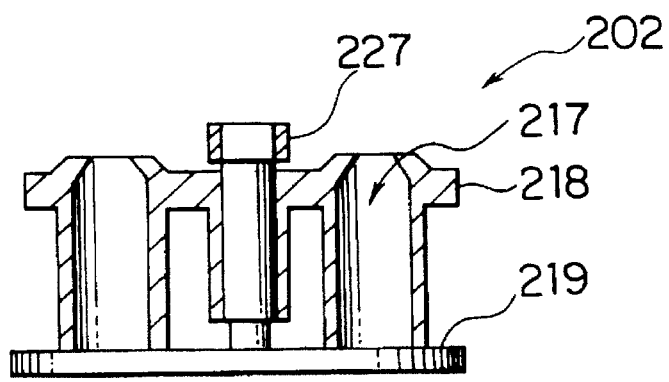
FIG. 29 is a sectional view illustrating the arrangement of a battery disposal case of the battery disposal and collection apparatus shown in FIGS. 25–27.

The arrangement of the entire battery disposal and collection apparatus is shown in FIGS. 27–29. Arranged on the inner plate on the top of the upper cover 201 is a drive unit 211 to which a cap holder 212 of a cap mounting unit is connected. The cap holder 212 contains a spring 213 mounted on the drive unit 211 and a pressing plate 214 pressed by the spring 213. Also, it contains and holds an insulative cap 215 pressed by the spring 213 and the pressing plate 214.

The battery disposal case 202 consists of a case body 216, a battery guide case 218 provided on the inside of the case body 216 and having battery receiving holes 217, and a rotary plate 219 provided on the bottom of the battery guide case 218 to cover the battery receiving holes 217, which will be described later in detail. The battery receiving hole 217 may be constructed to receive one D battery, two C batteries, or three AA batteries in one hole, or to receive one battery of respective type in respective hole 217.

Then, by closing the upper cover 201, the cap holder 212 can be varied for its position to the position where it can contact the battery 221 set in the battery receiving hole 217 of the battery guide case 218, and can hold a predetermined compressed condition.

Now, insulating of the terminal of the battery 221 is described. After the upper cover 201 is opened from the battery disposal case 202 around the hinge, 204, as shown in FIG. 35, a used-up and unavailable battery 221 to be disposed is set in the battery receiving hole 217 of the battery guide case 218 arranged on the battery disposal case. Although the batteries 221 may be manually set in the battery receiving hole 217 by an operator one after another, it is desirable to automatically sort and set the various batteries by a battery sorter which sorts the batteries into respective types.

Figure 30:
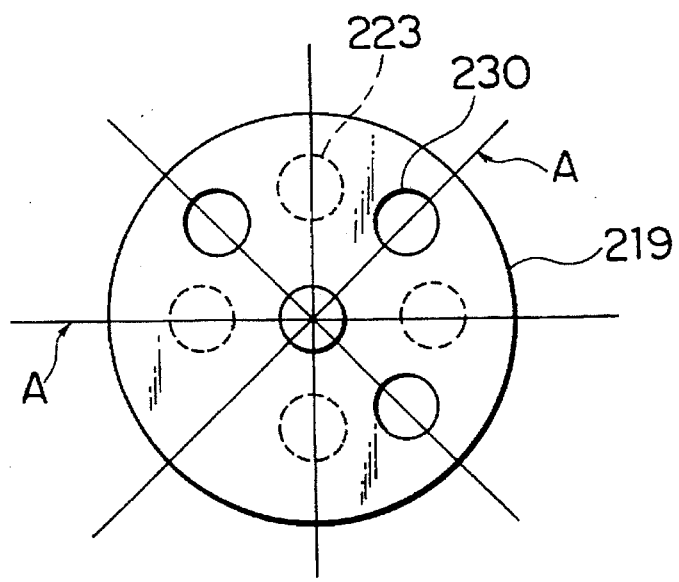
FIG. 30 is a plan view illustrating the arrangement of a rotary plate of the battery disposal and collection apparatus shown in FIGS. 25–27.
Figure 31:
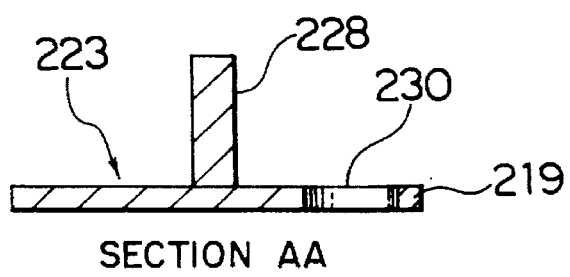
FIG. 31 is a sectional view illustrating the arrangement of a rotary plate of the battery disposal and collection apparatus shown in FIGS. 25–27.
Figure 32:
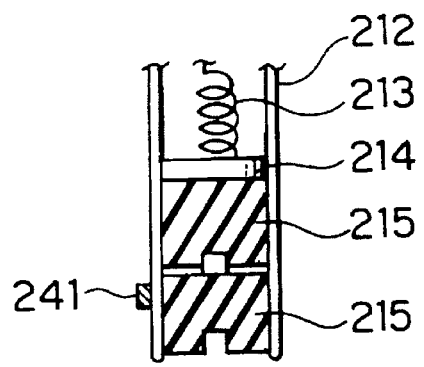
FIGS. 32 through 34 are procedure for mounting a cap on a terminal of a battery by a cap mounting unit of the battery disposal and collection apparatus shown in FIGS. 25–27.
Figure 32:
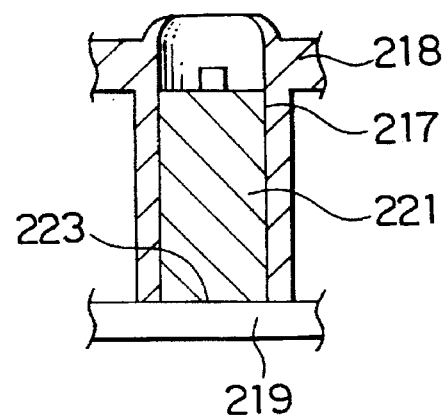
Figure 33:
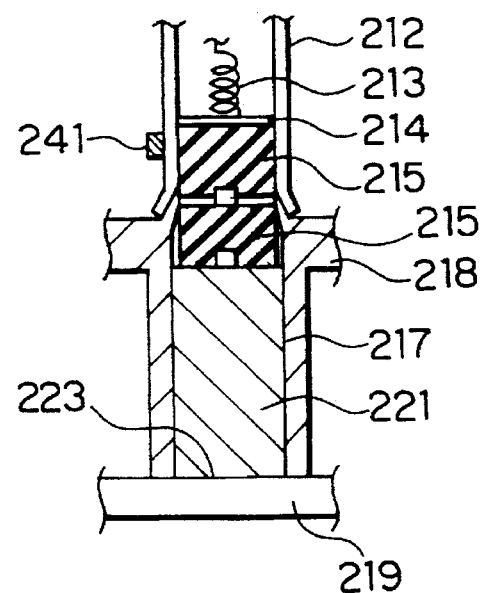
Figure 36:
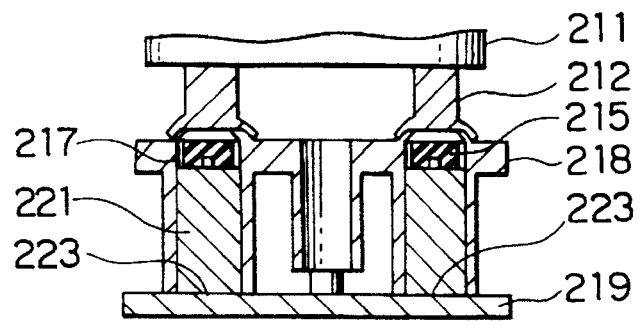
FIG. 36 is a state where the cap is mounted on the terminal of battery when an upper cover is closed after the batteries are set in the battery disposal case of the battery disposal and collection apparatus shown in FIGS. 25–27.

When the battery 221 is set in the battery receiving hole 217, battery mounting sections 223 arranged on a plane on the rotary plate 219 disposed under the battery guide case 218 as shown in FIGS. 30, 31, 32, 35, and 36 are positioned at a predetermined positions in the battery receiving holes 217 so that a battery mounting section 223 of the rotary plate 219 contacts one of the terminals of the battery 221. FIG. 32 shows a state where the upper cover 201 opens before the cap holder 212 contacts the top of the battery receiving hole 217 of the battery guide case 218. When, in this state, the upper cover-201 is put on the battery disposal case 202 and closed, as shown in FIGS. 33 and 36, the cap holder 212 is connected to the top of the battery receiving hole 217 of the battery guide case 218.

At the moment, an insulative cap 215 in the cap holder 212 is urged by the pressing plate 214 pressed by the spring 213, pushed out from the cap holder 212, and enters in the battery receiving hole 217 so that the recess in the insulative cap 215 is fitted in the terminal of battery 221 received in the battery receiving hole 217. The spring 213 is constituted by taking into consideration quick pushing out of the insulative cap 215 in the cap holder 212 in such a manner that it is driven by closing the upper cover 201 to apply a force for pushing out one insulative cap 215. In addition, the cap holder 212 is formed with a notch at its front end, which front end is spread for its diameter as shown in the figure when it is connected to the top of the battery receiving hole 217.

In addition, the insulative cap 215 is arranged to have an outer diameter slightly larger than the inner diameter of the cap holder 212 so that it is not dropped from the cap holder 212 while the upper cover 201 opens.

Figure 34:
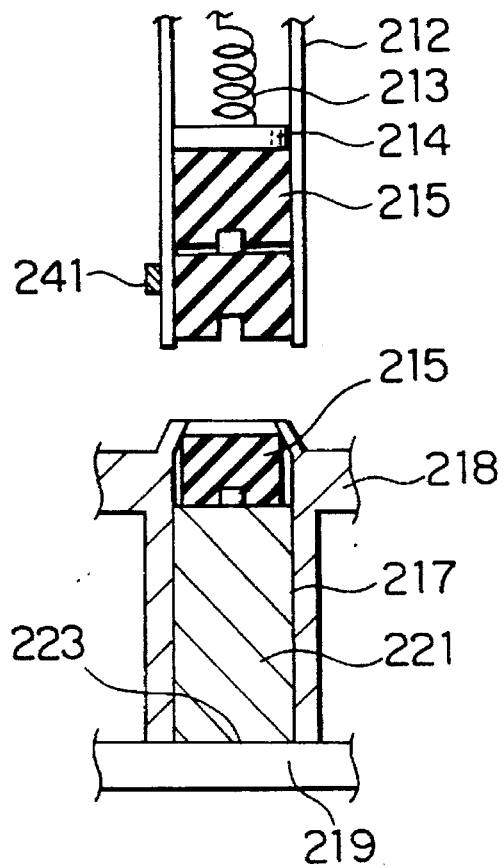

The insulative cap 215 pushed out from the cap holder 212 and fitted on the terminal of the battery 221 is arranged, as shown in FIG. 34, provide a holding force for the fitting section so that the cap is not brought away when the cap holder 212 is left from the battery guide case 218 when the upper cover 201 is opened.

After the terminal of the battery 221 received in the battery receiving hole 217 is completed for insulation by the insulative cap 215 of the cap holder 212, the rotary plate 219 is rotated and moved by a predetermined distance under the control of the drive unit 211 as a motor such as a stepping motor drives a worm gear 227 connected thereto which is in turn connected to the shaft 228 of the rotary plate 219.

Figure 37:
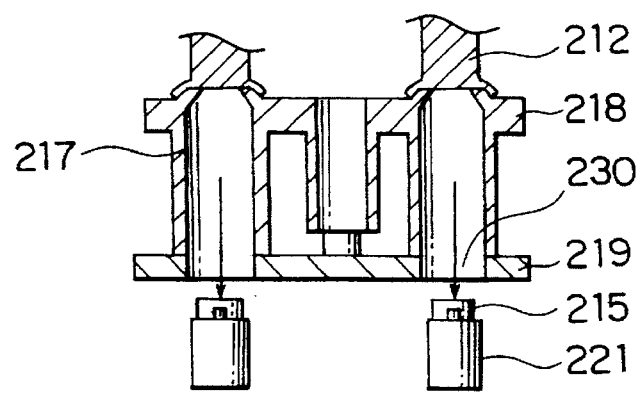
FIG. 37 is a state when the batteries are dropped in the battery container after the batteries are insulated by mounting the cap on the terminal of the battery with the battery disposal and collection apparatus shown in FIGS. 25–27.

Then, as the rotary plate 219 rotates to align a battery dropping hole 230 provided in the rotary plate 219 as shown in FIGS. 30 and 31 with the battery receiving hole 217 of the battery guide case 218, one of the terminals of the battery 221 is released from the electrode terminal 223 of the rotary plate 219, as shown in FIG. 37, and, because the terminal of the battery 221 on the cap holder 212 is held by the pressing plate 214 pressed by the spring 213 of the cap holder 212, the battery 221 is dropped into the battery container 203 through the battery dropping hole 230 in the rotary plate 219.

Thus, the embodiment according to the eleventh feature can insulate the terminal of the battery 221 by inserting the insulative cap 215 in the cap holder 212 into the terminal of the battery 221 received in the battery receiving hole 217 so that short-circuiting can be prevented even if the terminals of the batteries 221 contact each other while the insulated batteries 221 are temporarily stored in the battery container 203.

Accordingly, because heat can be prevented from generation due to contact of the terminals of the batteries 221, risks such as fire or burn can be prevented.

The embodiment according to the twelfth feature constitutes the pressing means pressing the insulative cap 215 in the cap holder 212 by the spring 213, and the pressing plate 214 pressed by he spring 213 so that, when the insulative cap 215 in the cap holder 212 is inserted into the terminal of the battery 221 received in the battery receiving hole 217 by closing the upper cover 201, the insulative cap 215 in the cap holder 212 can be surely and stably inserted into the battery 221 received in the battery receiving hole 217 by suitably adjusting the pressing force of the spring 213 provided on the pressing plate 214 pressing the insulative cap 215.

The embodiment according to the thirteenth feature is constituted in such a manner that the rotary plate means rotates and moves the rotary plate 219 to a predetermined position so that the positions of the battery mounting section 223 and the battery dropping hole 230 can be varied.

Thus, because the positions of the battery mounting section 223 on the rotary plate 219 and the battery dropping hole 230 can be suitably adjusted by rotating the rotary plate 219, when the terminal of the battery 221 is insulated, the battery mounting section 223 of the rotary plate 219 can be automatically positioned at the position of the terminal of the battery 221 received in the battery receiving hole 217 opposite to the cap holder 212, and the battery dropping hole 230 of the rotary plate 219 can be automatically positioned at the position of the battery 221 received in the battery receiving hole 217 after insulating the terminal of the battery 221.

The embodiment according to the fourteenth feature is constituted in such a manner that the rotary plate means rotates the rotary plate 219 so that, when the insulative cap 215 of the cap holder 212 is put into contact with a terminal of the battery 221 received in the battery receiving hole 217, the battery mounting section 223 is put into contact with the terminal of the battery 221 opposite to that contacting the cap holder 212, and rotates the rotary plate 219 so that, when the insulative cap 215 of the cap holder 212 is inserted into a terminal of the battery 221 for insulation, the battery 221 received in the battery receiving hole 217 is dropped in the battery container 203, and the battery dropping hole 230 is positioned at the position of a battery received in the battery receiving hole 217.

Thus, when the terminal of the battery 221 is insulated by inserting the insulative cap 215, the rotary plate 219 can be rotated so that the battery mounting section 223 is positioned at the terminal of the battery 221 opposite to the cap holder 212, and, after the terminal of the battery 221 is insulated, can be rotated so that the battery dropping hole 230 is positioned at the position of the battery received in the battery receiving hole 217. Accordingly, the rotary plate means can automatically and efficiently insulate the terminal of the battery 221, and drop the battery 221 into the battery container 203.

The embodiment according to the fifteenth feature is constituted in such a manner that the rotary plate means is made the standby state by receiving the battery 221 on the battery mounting section 223 in the battery receiving hole 217, and closing the battery guide case 218 with the upper cover 201 to insert the insulative cap 215 of the cap holder 212 into a terminal of the battery 221 in the battery receiving hole 217, and operated by turning on an operation switch 208 located on an operation panel 206 of the apparatus.

Thus, the standby state cannot be attained if the upper cover 201 is not closed, and the rotary plate 219 cannot be rotated unless the operation switch 208 is turned on so that the insulation of battery 221 can be performed with a simple operation while assuring the safety.

Although the above embodiment is not referred to the type of battery 221, the present invention can apply to any battery, and particularly, is suitable for a button battery such as the lithium battery.

Figure 38:
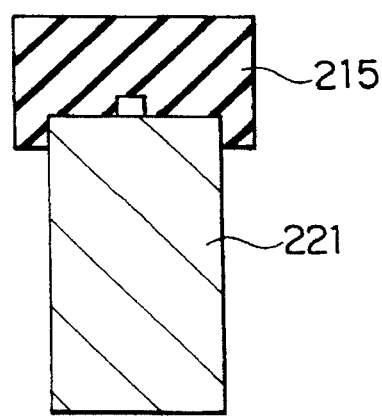
FIG. 38 is a state where insulation is performed by mounting the cap up to the corner of a battery to which the present invention can be applied.

Although the above embodiment is described for a case where the terminal of the battery 221 is insulated by inserting the insulative cap 215 only into the terminal of the battery 221, the present invention may be constituted to, as shown in FIG. 38, perform insulation by inserting the insulative cap 215 up to the corner of the battery 221 which easily leaks solutions when inserting the insulative cap 215 into the terminal of the battery 221. In this case, leakage from the corner of the battery 221 can be prevented.

The embodiment according to the sixteenth feature is constituted, as shown in FIGS. 32–34, to sense remaining quantity of the insulative caps 215 in the cap holder 212 with a sensor 241, and to warn the operator by flashing a lamp on the LCD panel 207 or sounding a buzzer when the sensed remaining quantity of insulative cap 215 becomes less than a predetermined quantity, as shown in FIGS. 32–34. In this case, because the operator can know with the warning that the remaining quantity of insulative caps 215 in the cap holder 212 becomes less than the predetermined quantity, he or she can appropriately supply the insulative caps 215 in the cap holder 212 without causing shortage of the insulative caps.

The embodiment according to the seventeenth feature is constituted to, similar to above as shown in FIGS. 32–34, sense remaining quantity of insulative caps 215 in the cap holder 212 with a sensor 241, and to stop the operation of the drive unit 211 of the rotary plate 219 when the sensed remaining quantity of insulative cap 215 becomes less than a predetermined quantity. In this case, because the operator can know with stopping of the operation of the rotary plate 219 that the remaining quantity of insulative caps 215 in the cap holder 212 becomes less than the predetermined quantity, he or she can appropriately supply the insulative caps 215 in the cap holder 212 without causing shortage of the insulative caps.

These two embodiments may be combined. First, after warning is issued to the operator for indicating that the remaining quantity of the insulative cap 215 is low, when the remaining quantity of the insulative cap 215 becomes lower, the driving of the rotary plate 219 is stopped. This enables it to further surely prevent shortage of the insulative cap 215. In this case, it is sufficient to provide two sensors 241. The sensor 241 may be a photo-sensor detecting variation of reflectance which changes for presence or absence of the insulative cap 215 in the cap holder 212.

Figure 39:
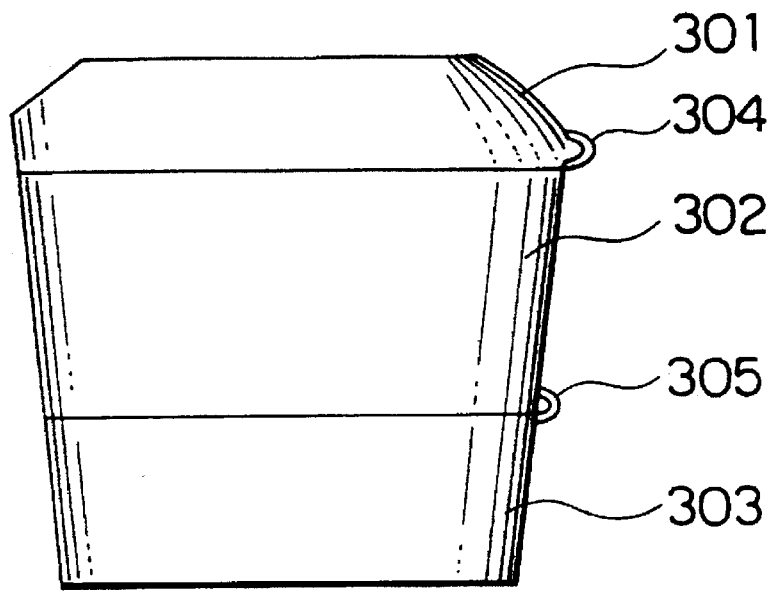
FIG. 39 is a front view illustrating the appearance of entire battery disposal and collection apparatus according to yet another embodiment of the present invention.
Figure 40:
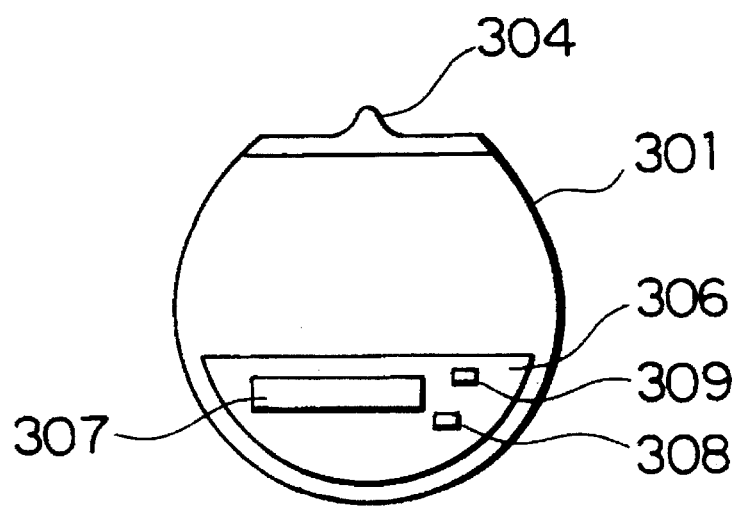
FIG. 40 is plan view illustrating the appearance of the entire battery disposal and collection apparatus shown in FIG. 39.
Figure 41:
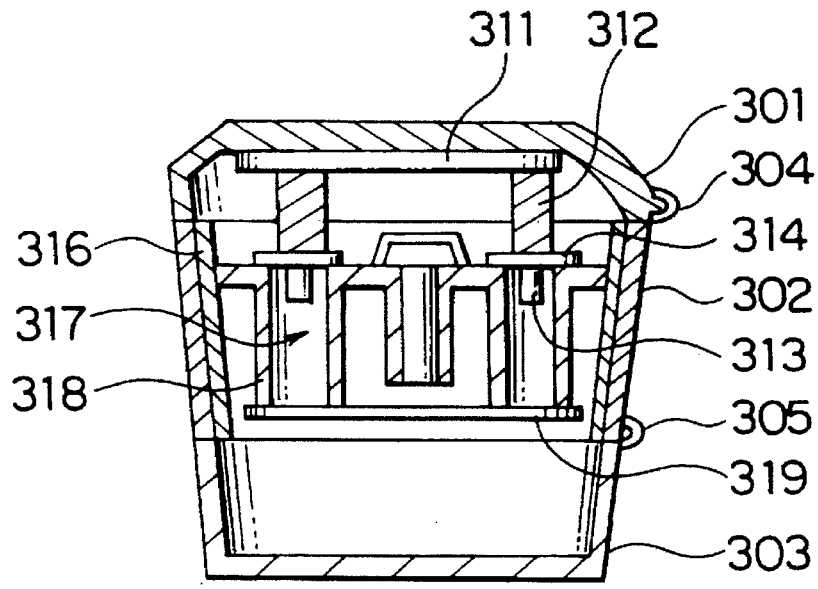
FIG. 41 is a sectional view illustrating the arrangement of the battery disposal and collection apparatus shown in FIGS. 39 and 40.
Figure 49:
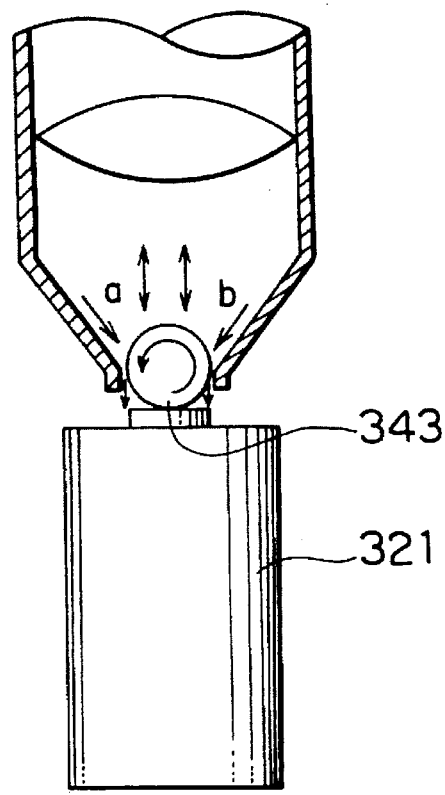
FIG. 49 is a manner for applying electrical insulation agent on a terminal of a battery with the application unit shown in FIG. 46.
Figure 50:
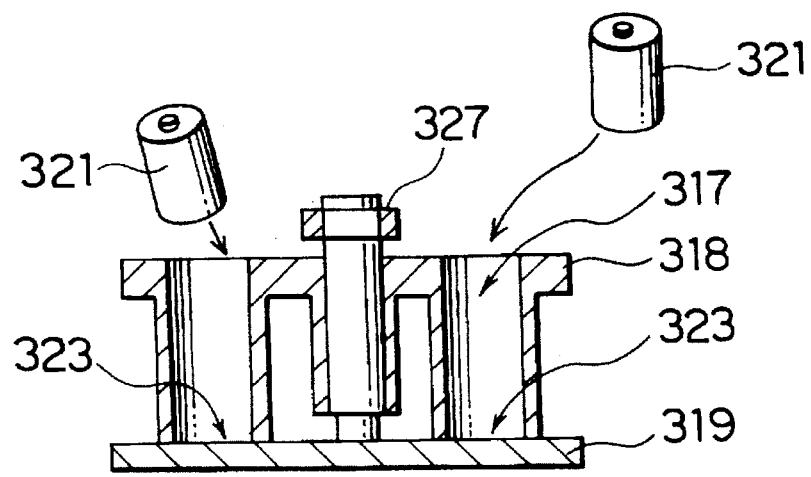
FIG. 50 is a state of a battery guide case and the rotary plate when batteries are set in the battery disposal case of the battery disposal and collection apparatus shown in FIGS. 39–41.

FIGS. 39–41 show the arrangement of a battery disposal and collection apparatus according to yet another embodiment of the present invention. FIG. 39 is a front view illustrating the appearance of entire battery disposal and collection apparatus, FIG. 40 is plan view illustrating the appearance of the entire battery disposal and collection apparatus shown in FIG. 39, FIG. 41 is a sectional view illustrating the arrangement of the entire battery disposal and collection apparatus shown in FIGS. 39 and 40, FIGS. 42 and 43 are a plan view and a sectional view illustrating the arrangement of a battery disposal case of the battery disposal and collection apparatus shown in FIGS. 39–41, FIGS. 44 and 45 are a plan view and a sectional view illustrating the arrangement of a rotary plate of the battery disposal and collection apparatus shown in FIGS. 39–41, FIG. 46 is a sectional view illustrating the arrangement of an application unit of the battery disposal and collection apparatus shown in FIGS. 39–41, FIGS. 47 and 48 are a plan view and a sectional view illustrating a partition plate of the application unit shown in FIG. 46, FIG. 49 is a manner for applying electrical insulation agent on a terminal of a battery with the application unit shown in FIG. 46, FIG. 50 is a state of a battery guide case and the rotary plate when batteries are set in the battery disposal case of the battery disposal and collection apparatus shown in FIGS. 39–41, FIG. 51 is a state where the terminals of batteries contact a nozzle when an upper cover is closed after the batteries are set in the battery disposal case of the battery disposal and collection apparatus shown in FIGS. 39–41, FIG. 52 is a state when the batteries are dropped in the battery container after the batteries are insulated by the battery disposal and collection apparatus shown in FIGS. 39–41.

First, the arrangement is described. As shown in FIGS. 39 and 40, the battery disposal and collection apparatus of the embodiment roughly consists of an upper cover 301, a battery disposal case 302, and a battery container 303. The upper cover 301 can be closed and opened on the battery disposal case 302 with a hinge 304. The battery disposal case 302 can be also closed and opened on the battery container 303 with a hinge 305.

Although a simple arrangement for closing/opening respective components with the hinges 304 and 305 is shown in the figure, it is desirable to provide a lock mechanism for each component in view of safety when they are closed. Arranged on an operation panel 306 which is provided on the top of the upper cover 301 are an LCD panel 307 for displaying the operation guidance and the operation state, an operation switch (SW) 308, and an upper cover release button 309.

It is preferable that the upper cover 301 is always closed except for when the battery disposal case 302 receives a battery in order to protect terminals or the like from contamination or corrosion by moisture or dirt from the atmosphere. While the upper cover 301 can be opened by pressing the upper cover release button 309, it is desirable by taking forgetting of closure into consideration that an upper cover closing mechanism is provided so that the upper cover is automatically closed after a predetermined time period expires.

In addition, it is desirable that a series of operations of the apparatus is systematized by providing an operation prohibit mechanism so that any operation cannot be performed even if the operation switch 308 or the like is operated unless the upper cover 301 is closed.

Figure 42:
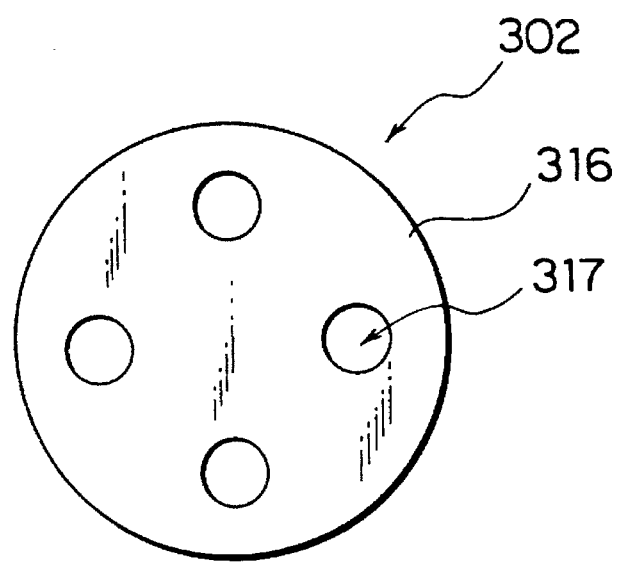
FIG. 42 is a plan view illustrating the arrangement of a battery disposal case of the battery disposal and collection apparatus shown in FIGS. 39–41.
Figure 43:
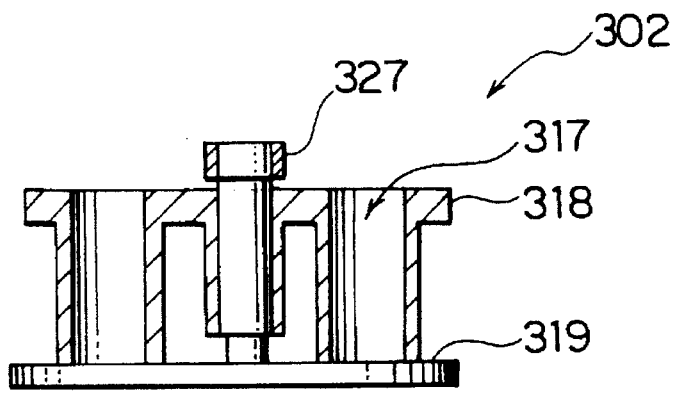
FIG. 43 is a sectional view illustrating the arrangement of a battery disposal case of the battery disposal and collection apparatus shown in FIGS. 39–41.

The arrangement of the entire battery disposal and collection apparatus is shown in FIGS. 41–43. Arranged on the inner plate on the top of the upper cover 301 is a drive unit 311 to which an electrical insulation agent container 312 of the application unit. The electrical insulation agent container 312 is filled with silicon oil or epoxy resin. The former silicon oil is superior in handling or the like than the epoxy resin and preferable because it is a high viscosity material with good flowability. The electrical insulation agent container 312 is connected to a nozzle 313 into which the electrical insulation agent is introduced from the electrical insulation agent container 312. A guide plate 314 is connected between the electrical insulation agent container 312 and the nozzle 313.

The battery disposal case 302 consists of a case body 316, a battery guide case 318 provided on the inside of the case body 316 and having battery receiving holes 317, and a rotary plate 319 provided on the bottom of the battery guide case 318 to cover the battery receiving holes 317, which will be described later in detail. The battery receiving hole 317 may be constructed to receive one D battery, two C batteries, or three AA batteries in one hole, or to receive one battery of respective type in respective hole 317.

Then, by closing the upper cover 301, the nozzle 303 can be varied for its position to the position where it can contact the battery 321 set in the battery receiving hole 317 of the battery guide case 318, and can hold a predetermined compressed condition.

Now, insulation of the terminals of the battery 321 is described. After the upper cover 301 is opened from the battery disposal case 302 around the hinge 304, as shown in FIG. 50, a used-up and unavailable battery 321 to be disposed is set in the battery receiving hole 317 of the battery guide case 318 arranged on the battery disposal case. Although the batteries 321 may be manually set in the battery receiving hole 317 by an operator one after another, it is desirable to automatically sort and set the various batteries by a battery sorter which sorts the batteries into respective types.

Figure 51:
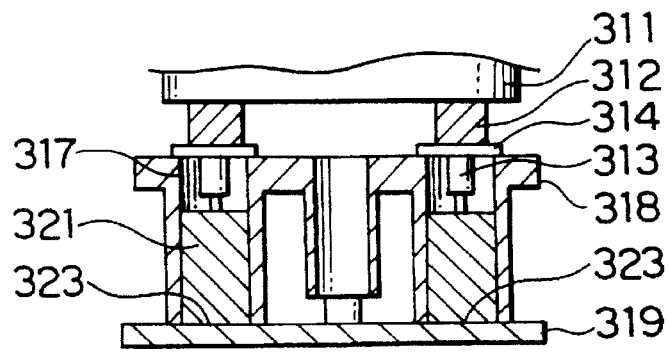
FIG. 51 is a state where the terminals of batteries contact a nozzle when an upper cover is closed after the batteries are set in the battery disposal case of the battery disposal and collection apparatus shown in FIGS. 39–41.
Figure 52:
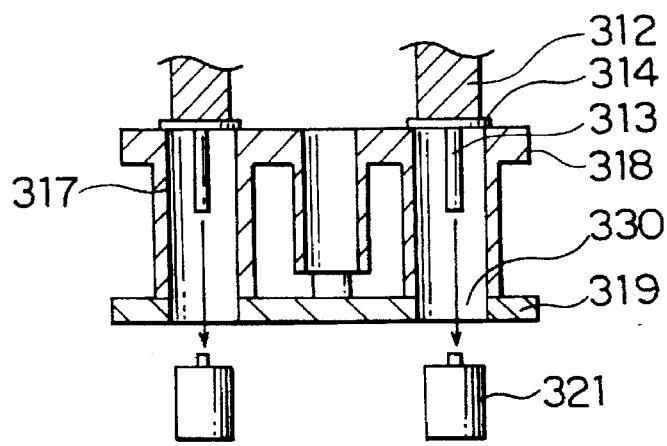
FIG. 52 is a state when the batteries are dropped in the battery container after the terminals of the battery are insulated by the battery disposal and collection apparatus shown in FIGS. 39–41.

When the battery 321 is set in the battery receiving hole 317, planar battery mounting sections 323 arranged on the rotary plate 319 disposed on the bottom of the battery guide case 318 as shown in FIGS. 44, 45, 50, and 51 are positioned at a predetermined positions in the battery receiving holes 317 so that a battery mounting section 323 of the rotary plate 319 contacts one of the terminals of the battery 321. When, in this state, the upper cover 301 is put on the battery disposal case 302 and closed, as shown in FIG. 51, the nozzle 313 is moved to contact the terminal of the battery 321 at the side opposite to the battery mounting section 323 of the rotary plate 319 so that the nozzle 313 is put into contact with the terminal of the battery 321.

The application unit used herein consists of, as shown in FIGS. 46–49, a partition plate 342 for separating the electrical insulation agent container 312 containing electrical insulation agent 341 from the nozzle 313, and having a ring-shaped groove 342a for introducing the electrical insulation agent 341 in the electrical insulation agent container 312 into a nozzle container 313a, a rotatable ball 343 provided in a nozzle opening 313b, and a compression spring 344 provided on the partition plate 342 for pressing the ball 343. The compression spring 344 is guided by a guide shaft 345 provided on the partition plate 342, and the partition plate 342 is provided with a liquid level guide 346 on the side of the nozzle 313 to correspond to the groove 342a.

Then, when the operation switch 308 on the operation panel 306 on the upper cover 301 is turned on, the drive unit 311 rotates and drives the rotary plate 319. This rotates and moves the rotary plate 319 thereby rotating and moving the battery 321. When the battery 321 is rotated and moved, the ball 343 provided in the nozzle opening 313b is rotated so that the electrical insulation agent 341 attached on the ball 343 is applied on the terminal of the battery 321 contacting the ball 343, and that small amount of electrical insulation agent 341 flowing out from a gap between the ball 343 and the nozzle opening 313b is applied on the terminal of the battery 321, the gap being caused by the contact between the ball 343 and the terminal of the battery 321, that is, by applying a predetermined pressure on the ball 343 with the terminal of the battery 321.

When the terminal of the battery 321 is not put into contact with the ball 343, the nozzle opening 313b can be closed by the pressing force from the compression spring 344 provided on the partition plate 342 so that the electrical insulation agent 341 can be prevented from flowing out. In addition, since the ball 343 can change its contact surface by the contact movement with the terminal of the battery 321 from the rotational movement of the rotary plate 319, the ball 343 can always apply a fixed amount of electrical insulation agent 341 on the terminal of the battery 321. This enables it to constantly apply the electrical insulation agent 341 in a small but fixed amount on the terminal of the battery 321.

After the application unit completes insulation of the terminal of the battery 321 received in the battery receiving hole 317, the rotary plate 319 is rotated and moved by a predetermined distance under the control of the drive unit 311 as a motor such as a stepping motor drives a worm gear 327 connected thereto which is in turn connected to the shaft 328 of the rotary plate 319.

Figure 44:
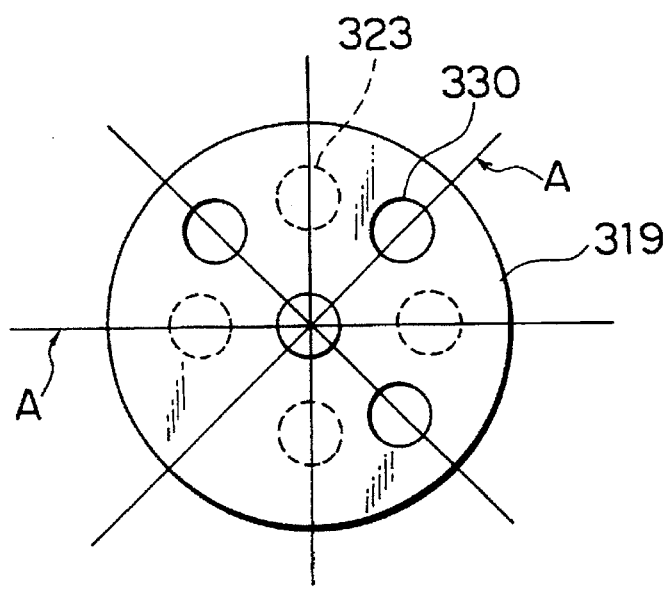
FIG. 44 is a plan view illustrating the arrangement of a rotary plate of the battery disposal and collection apparatus shown in FIGS. 39–41.
Figure 45:
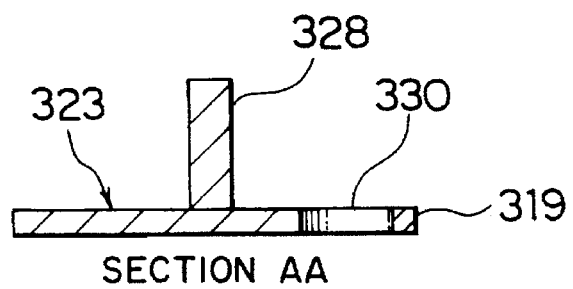
FIG. 45 is a sectional view illustrating the arrangement of a rotary plate of the battery disposal and collection apparatus shown in FIGS. 39–41.
Figure 46:
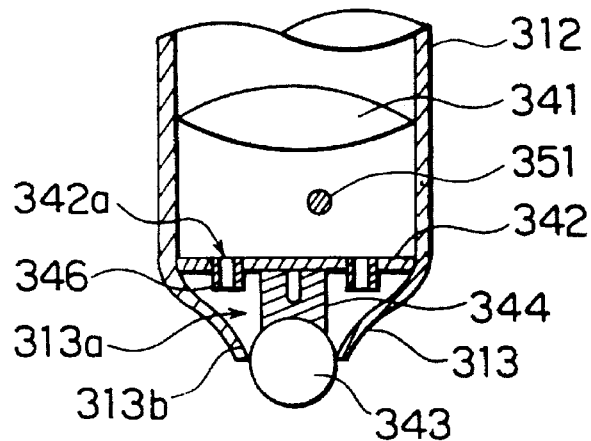
FIG. 46 is a sectional view illustrating the arrangement of an application unit of the battery disposal and collection apparatus shown in FIGS. 39–41.
Figure 47:
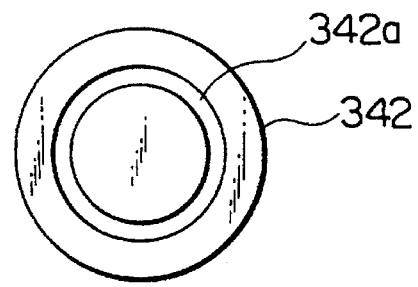
FIG. 47 is a plan view illustrating the arrangement of a partition plate of the application unit shown in FIG. 46.
Figure 48:
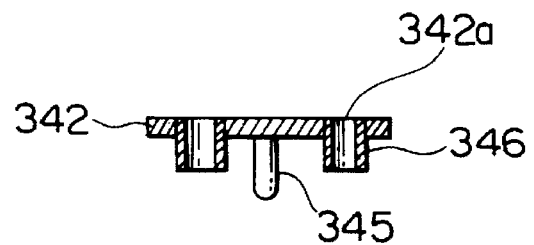
FIG. 48 is a sectional view illustrating the arrangement of a partition plate of the application unit shown in FIG. 46.

Then, as the rotary plate 319 rotates to align a battery dropping hole 330 provided in the rotary plate 319 as shown in FIGS. 44 and 45 with the battery receiving hole 317 of the battery guide case 318, because the terminal of the battery 321 on the side of the nozzle 313 is held by the nozzle 313, the battery 321 is dropped into the battery container 303 through the battery dropping hole 330 in the rotary plate 319 by the pressing force of the nozzle 313 or the like.

Thus, the embodiment according to the eighteenth feature is constituted in such a manner that the nozzle 313 is put into contact with the terminal of the battery 321 received in the battery receiving hole 317, and the electrical insulation agent 341 can be applied on the terminal of the battery 321 so that it is possible not to cause short-circuiting even if the terminals of batteries 321 contact each other while the insulated batteries 321 are temporarily stored in the battery container 303.

Accordingly, because heat can be prevented from generation due to contact of the terminals of the batteries 321, risks such as fire or burn can be prevented.

The embodiment according to the nineteenth feature constitutes the electrical insulation agent application unit to comprise a partition plate 342 for partitioning the electrical insulation agent container 312 and the nozzle 313, and having a groove 342a for introducing the electrical insulation agent 341 in the electrical insulation agent container 312 to the nozzle container 313a, a rotatable ball 343 provided in the nozzle opening 313b, and a compression spring 344 pressing the ball 343 provided on the partition plate 342.

Thus, the electrical insulation agent 341 in the electrical insulation agent container 312 can be introduced from the groove 342a in the partition plate 342 partitioning the electrical insulation agent container 312 and the nozzle 313 to the nozzle container 313a, and the electrical insulation agent 341 in the nozzle container 313a attached on the ball 343 can be applied on the terminal of the battery 321 by rotating the ball 343 rotatably provided on the nozzle opening 313b contacting the terminal of the battery 321.

In addition, the electrical insulation agent 341 flowing out through the gap between the ball 343 and the nozzle opening 313b caused by contact between the ball 343 and the terminal of the battery 321 can be applied on the terminal of the battery 321. Furthermore, when the ball 343 is not put into contact with the terminal of the battery 321, the ball 343 can close the nozzle opening 313b with the pressing force of the compression spring 344 provided on the partition plate 342 so that the electrical insulation agent 341 can be prevented from flowing outside.

The embodiment according to the twentieth feature constitutes the rotary plate means to rotate and move the rotary plate 319 to a predetermined position so that the positions of the battery mounting section 323 and the battery dropping hole 330 can be varied.

Thus, because the positions of the battery mounting section 323 and the battery dropping hole 330 of the rotary plate 319 can be suitably varied by rotating the rotary plate 319, when the terminal of the battery 321 is insulated, the battery mounting section 323 on the rotary plate 319 can be automatically positioned at the position of the terminal of the battery 321 received in the battery receiving hole 317 opposite to the nozzle 313, and the battery dropping hole 330 in the rotary plate 319 can be automatically positioned at the position of the battery 321 received in the battery receiving hole 317 after insulating the terminal of the battery 321.

The embodiment according to the twenty-first feature constitutes the rotary plate means to rotate the rotary plate 319 so that, when a terminal of the battery 321 received in the battery receiving hole 317 is put into contact with the nozzle 313, the battery mounting section 323 is at the terminal of the battery 321 opposite to the side of nozzle 313, and to rotate the rotary plate 319 so that, after the terminal of the battery 321 is insulated by applying the electrical insulation agent 341 with the nozzle 313, the battery 321 received in the battery receiving hole 317 is dropped in the battery container 303, and the battery dropping hole 330 is positioned at the position of battery received in the battery receiving hole 317.

Thus, when the electrical insulation agent 341 is applied on the terminal of the battery 321 for insulation, the rotary plate 319 can be rotated to bring the battery mounting section 323 to the terminal of the battery 321 opposite to the nozzle 313, and, after the terminal of the battery 321 is insulated, the rotary plate 319 can be rotated to bring the battery dropping hole 330 to the position of the battery received in the battery receiving hole 317. Therefore, the rotary plate means can automatically and efficiently insulate the terminal of the battery 321, and drop the battery into the battery container 303.

The embodiment according to the twenty-second feature is constituted in such a manner that the rotary plate means is made the standby state by receiving the battery on the battery mounting section 323 in the battery receiving hole 317, and closing the battery guide case 318 with the upper cover 301 to put the nozzle 313 into contact with the terminal of the battery 321 in the battery receiving hole 317, and operated by turning on an operation switch 308 located on a operation panel 306 of the apparatus.

Thus, the standby state cannot be attained if the upper cover 301 is not closed, and the rotary plate 319 cannot be rotated unless the operation switch 308 is turned on so that the insulation of battery 321 can be performed with a simple operation while assuring the safety.

The embodiment according to the twenty-third feature constitutes the electrical insulation agent application unit to rotate the ball 343 provided in the nozzle opening 313b by rotational movement of the rotary plate 319, the ball 343 being put into contact with the terminal of the battery 321 by rotational movement of the battery 321 on the battery mounting section 323, applies the electrical insulation agent 341 attached on the ball 343 on the terminal of the battery 321 contacting the ball 343, and to apply on the terminal of the battery 321 the electrical insulation agent 341 which flows out through a gap between the ball 343 and the nozzle opening 313b caused from the contact between the ball 343 and the terminal of the battery 321.

Thus, the electrical insulation agent 341 attached on the ball 343 can be applied on the terminal of the battery 321 by rotating the ball 343 rotatably provided on the nozzle opening 313b contacting the terminal of the battery 321, the ball 343 being rotated through the rotational movement of the battery 321 on the battery mounting section 323 by rotating and moving the rotary plate 319. In addition, the electrical insulation agent 341 flowing out through the gap between the ball 343 and the nozzle opening 313b caused by contact between the ball 343 and the terminal of the battery 321 can be applied on the terminal of the battery 321.

The embodiment according to the twenty-fourth feature constitutes the flow rate of the electrical insulation agent 341 from the electrical insulation agent container 312 to the nozzle container 313a to be controlled by air pressure on the liquid surface of the electrical insulation agent 341 in the nozzle container 313a.

Thus, the stock of electrical insulation agent in the nozzle container can be controlled.

Although the above embodiment is not referred to the type of battery 321, the present invention can apply to any battery, and particularly, is suitable for a button battery such as the lithium battery.

Figure 53:
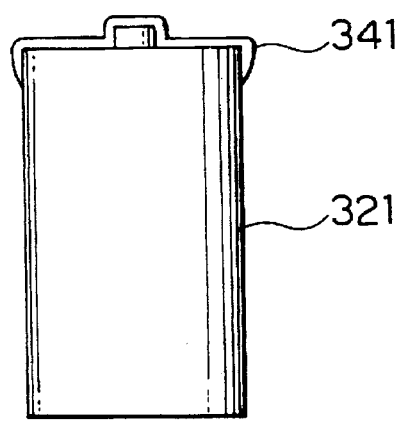
FIG. 53 is a state where insulation is performed by applying the electrical insulation agent up to the corner of a battery to which the present invention can be applied.

Although the above embodiment is described for a case where the terminal of the battery 321 is insulated by applying the electrical insulation agent 341 only on the terminal of the battery 321, the present invention may be constituted, as shown in FIG. 53, to perform insulation by applying the electrical insulation agent 341 up to the corner of the battery 321 which easily leaks solutions when applying the electrical insulation agent on the terminal of the battery 321. In this case, leakage from the corner of the battery 321 can be prevented. To apply the electrical insulation agent 341 up to the corner of the battery 321 as just described, it is sufficient to widen the gap between the ball 343 and the nozzle opening 313b to increase the flow rate of the electrical insulation agent 341 from the nozzle 313. To widen the gap between the ball 343 and the nozzle opening 313b, it is sufficient to increase the contact pressure between the ball 343 and the terminal of the battery 321 by adjusting positioning of the guide plate 314 thereby increasing the amount of push-up of the ball 343 by the terminal of the battery 321.

The embodiment according to the twenty-fifth feature may be constituted to, as shown in FIG. 46, sense remaining amount of the electrical insulation agent 341 in the electrical insulation agent container 312 with a sensor 351, and to warn the operator by flashing a lamp on the LCD panel 307 or sounding a buzzer when the sensed remaining amount of the electrical insulation agent 341 becomes less than a predetermined amount. In this case, because the operator can know with the warning that the remaining amount of the electrical insulation agent 341 in the electrical insulation agent container 312 becomes less than the predetermined amount, he or she can appropriately supply the electrical insulation agent 341 in the electrical insulation agent container 312 without causing shortage of the electrical insulation agent.

The embodiment according to the twenty-sixth feature may be constituted to, similar to above as shown in FIG. 46, sense remaining amount of the electrical insulation agent 341 in the electrical insulation agent container 312 with a sensor 351, and to stop the operation of the drive unit 311 of the rotary plate 319 when the sensed remaining amount of the electrical insulation agent 341 becomes less than a predetermined amount. In this case, because the operator can know with stopping of the operation of the rotary plate 319 that the remaining amount of the electrical insulation agent 341 in the electrical insulation agent container 312 becomes less than the predetermined amount, he or she can appropriately supply the electrical insulation agent 341 in the electrical insulation agent container 312 without causing shortage of the electrical insulation agent.

These two embodiments may be combined. First, after warning is issued to the operator for indicating that the remaining amount of the electrical insulation agent 341 is low, when the remaining amount of the electrical insulation agent 341 becomes lower, the driving of the rotary plate 319 is stopped. This enables it to further surely prevent shortage of the electrical insulation agent 341. In this case, it is sufficient to provide two sensors 351. The sensor 351 may be a photo-sensor detecting variation of reflectance on the liquid surface of the electrical insulation agent 341 which changes for presence or absence of the electrical insulation agent 341 in the electrical insulation agent container 312.

As described, the present invention is advantageous in that it can make difficult occurrence of risks such as fire or burns due to heat generation from the batteries by making difficult heat generation from short-circuiting of terminals of batteries in disposing batteries which are used up and unavailable so that the safety can be enhanced, and enables it to carry out disposal and recycling suitable for each battery by separating the types of batteries.

Many widely different embodiments of the present invention may be constructed without departing from the spirit and scope of the present invention. It should be understood that the present invention is not limited to the specific embodiments described in the specification, except as defined in the appended claims.

What is claimed is:

1. A battery disposal and collection apparatus comprising:
   an upper cover;
   battery treating device provided on said upper cover for performing a disposal treatment of a battery in safety;
   a battery guide case having a battery receiving hole for containing batteries;
   plate having a battery dropping hole and positioned under said battery guide case, the battery dropping hole permitting the battery contained in said battery receiving hole to pass through; and
   battery receiving container provided under said plate at a side of said plate opposite to said upper cover for storing a battery dropped through said battery dropping hole of said plate.

2. A battery disposal and collection apparatus according to claim 1, wherein said battery treating device comprises;
   a pressing element provided on said upper cover;
   a terminal connection connected to said pressing element and having a terminal electrode pressed by said pressing element;
   an electrode terminal provided under said battery guide case at side thereof opposite to said upper cover, and, when a terminal of a battery contained in said battery receiving hole contacts said terminal electrode, contacting the terminal of the battery opposite to the one at said terminal electrode; and
   battery discharge means for discharging current flowing between said terminal electrode of said terminal connection contacting the terminal of battery contained in said battery receiving hole and said electrode terminal, wherein said battery guide case is opened and closed by said upper cover, and said terminal electrode is inserted therein when said upper cover is closed.

3. A battery disposal and collection apparatus according to claim 2, wherein said terminal connection comprises a guide plate and a compression spring so that the position of a contact point at said terminal electrode with the battery contained in said battery receiving hole can be readily varied.

4. A battery disposal and collection apparatus according to claim 2, including a rotary plate drive for rotating and moving said plate to a predetermined position so that said electrode terminal and the position of said battery dropping hole can be varied.

5. A battery disposal and collection apparatus according to claim 4, wherein said rotary plate drive comprises means to rotate the plate so that, when a terminal of the battery contained in said battery receiving hole is put into contact with said terminal electrode of said terminal connection, said electrode terminal is put into contact with the terminal of the battery opposite to that contacting said terminal electrode, and to rotate the plate so that, after discharging, the battery contained in said battery receiving hole is dropped in said battery receiving container, and said battery dropping hole is positioned at the position of a battery contained in said battery receiving hole.

6. A battery disposal and collection apparatus according to claim 2, wherein said battery discharge means is made in a standby state by positioning the battery in said battery receiving hole, closing said battery guide case with said upper cover, and connecting the terminals of the battery to said terminal electrode and said electrode terminal, respectively, and then is operated by turning on a switch located on a operation panel of the apparatus.

7. A battery disposal and collection apparatus according to claim 2, wherein said battery discharge means has, on a connection line, a switch closing a connection line between output terminals of said terminal electrode and said electrode terminal, and a resistor for buffering short-circuit current flowing between said output terminals when the connection line is closed by said switch.

8. A battery disposal and collection apparatus according to claim 1, further comprising:
   battery separation and detection means arranged on a part of the guide case, and identifying the type of battery based on an identification mark or a color of the battery for identifying the type of battery provided on the battery received in said battery receiving hole, wherein said battery container receives the battery based on the identified type of battery.

9. A battery disposal and collection apparatus according to claim 8 further comprising:

a rotary drive for rotating and moving at least one of said battery guide case and a battery separation case of said battery container to a predetermined position.

10. A battery disposal and collection apparatus according to claim 8, including a rotary plate drive which rotates said plate so that, when a terminal of the battery received in said battery receiving hole is put into contact with said terminal electrode of said terminal connection, said electrode terminal is put into contact with the terminal of the battery opposite to that contacting said terminal electrode, said battery discharge means discharges the battery, said battery separation and detection means identifies the type of battery, including a rotary drive means which rotates at least one of said battery guide case and a battery separation case to a predetermined position so as to receive the battery in said battery separation case corresponding to the identified type of battery, and said rotary plate drive rotates said plate so that said battery dropping hole is positioned at the position of the battery received in said battery receiving hole to drop in said battery separation case corresponding to the identified type of battery.

11. A battery disposal and collection apparatus according to claim 9, wherein said battery separation case has a dedicated battery case divided into at least two, a rotation shaft and gears being arranged at the center of case, the case body being supported by a guide, recesses being arranged in the circumferential direction on the outer side of the case, a groove opposite to the recess being provided in the battery container containing the case, a bearing arranged with a ball, a compression spring, and a ball stopping plate in said groove.

12. A battery disposal and collection apparatus according to claim 1, wherein said battery treating device is a battery insulator for insulating one of terminals of said battery.

13. A battery disposal and collection apparatus according to claim 12, wherein said battery insulator comprises;

a pressing device provided on said upper cover, a cap holder for containing said pressing device, and for containing and holding an insulative cap pressed by said pressing device, and provided on said upper cover; and battery mounting section being provided under said battery guide case at the side opposite to said upper cover, and contacting the terminal of the battery opposite to said cap holder when said insulative cap of said cap holder is inserted into the terminal of the battery contained in said battery receiving hole, wherein said battery guide case is opened and closed by said upper cover, and the insulative cap at the top of said cap holder is inserted into the terminal of the battery contained in said battery receiving hole when said upper cover is closed.

14. A battery disposal and collection apparatus according to claim 13, wherein said pressing device comprises a spring and a pressing plate pressed by said spring.

15. A battery disposal and collection apparatus according to claim 13, wherein said rotary plate drive has a rotary drive for rotating and moving said plate to a predetermined position so that the positions of said battery mounting section and said battery dropping hole can be varied.

16. A battery disposal and collection apparatus according to claim 13, including a rotary plate drive comprises means which rotates the rotary plate so that, when the insulative cap of said cap holder is inserted into a terminal of the battery contained in said battery receiving hole, said battery mounting section is put into contact with the terminal of the battery opposite to that contacting said cap holder, and rotates said plate so that, when the insulative cap of said cap holder is inserted into a terminal of the battery for insulation, the battery contained in said battery receiving hole is dropped in the battery receiving container, and said battery dropping hole is positioned at the position of a battery contained in said battery receiving hole.

17. A battery disposal and collection apparatus according to claim 13, wherein said plate is made in a standby state by positioning the battery on said battery mounting section in said battery receiving hole, and closing said battery guide case with said upper cover to insert the insulative cap of said cap holder into a terminal of the battery mounted on said battery mounting section, and operated by turning on a switch located on a operation panel of the apparatus.

18. A battery disposal and collection apparatus according to claim 13 further comprising remaining quantity sensing means for sensing the remaining quantity of insulative caps in said cap holder, and warning means for warning the operator when the sensed remaining quantity of insulative cap becomes less than a predetermined quantity.

19. A battery disposal and collection apparatus according to claim 13 further comprising remaining quantity sensing means for sensing the remaining quantity of insulative caps in said cap holder, and stop means for stopping the operation of said rotary plate means when the sensed remaining quantity of insulative cap becomes less than a predetermined quantity.

20. A battery disposal and collection apparatus according to claim 12, wherein said battery insulator comprises;

electrical insulation agent container provided on said upper cover and for containing electrical insulation agent;

electrical insulation agent application means connected to said electrical insulation agent container and having a nozzle for applying the electrical insulation agent discharged from said electrical insulation agent container; and a battery mounting section provided under said battery guide case at the side opposite to said upper cover, so as to put the terminal of the battery contained in said battery receiving hole into contact with said nozzle, and contact the terminal of the battery opposite to said nozzle side when the electrical insulation agent is applied on the terminals of battery from said nozzle for insulation, wherein when said battery guide case is opened or closed by said upper cover, the nozzle is inserted to contact a terminal of the battery when said upper cover is closed.

21. A battery disposal and collection apparatus according to claim 20, wherein said electrical insulation agent application means partitions said electrical insulation agent container and said nozzle, and comprises a partition plate which has a groove for introducing the electrical insulation agent in said electrical insulation agent container to a nozzle container, a rotatable ball provided in a nozzle opening, and a compression spring pressing said ball.

22. A battery disposal and collection apparatus according to claim 20, wherein said plate has a rotary drive for rotating and moving said plate to a predetermined position so that the positions of said battery mounting section and said battery dropping hole can be varied.

23. A battery disposal and collection apparatus according to claim 20, wherein said plate has means which rotates said plate so that, when a terminal of the battery contained in said battery receiving hole is put into contact with said nozzle of said electrical insulation agent application means, said battery mounting section is put into contact with the terminal of the battery opposite to said nozzle side, and rotates said plate so that, after the terminal of the battery is insulated by applying the electrical insulation agent with said nozzle, the battery contained in said battery receiving hole is dropped in said battery receiving container, and said battery dropping hole is positioned at the position of battery contained in said battery receiving hole.

24. A battery disposal and collection apparatus according to claim 20, wherein said plate is in a standby state by receiving the battery on said battery mounting section in said battery receiving hole, and closing said battery guide case with said upper cover to cause the nozzle to contact the terminal of the battery in said battery receiving hole, and operated by turning on a switch located on an operation panel of the apparatus.

25. A battery disposal and collection apparatus according to claim 21, wherein said electrical insulation agent application means rotates said ball provided in said nozzle opening by rotational movement of the plate, said ball being put into contact with the terminal of the battery by rotational movement of the battery on said battery mounting section, applies the electrical insulation agent attached on said ball on the terminal of the battery contacting said ball, and applies on the terminal of the battery said electrical insulation agent which flows out through a gap between said ball and said nozzle opening caused from the contact between the ball and the terminal of the battery.

26. A battery disposal and collection apparatus according to claim 21, wherein the flow rate of the electrical insulation agent from said electrical insulation agent container to said nozzle container is controlled by air pressure on the liquid surface of said electrical insulation agent in said nozzle container.

27. A battery disposal and collection apparatus according to claim 20 further comprising remaining amount sensing means for sensing the remaining amount of the electrical insulation agent in said electrical insulation agent container, and warning means for warning the operator when the sensed remaining amount of the electrical insulation agent becomes less than a predetermined amount.

28. A battery disposal and collection apparatus according to claim 20 further comprising remaining amount sensing means for sensing the remaining amount of the electrical insulation agent in said electrical insulation agent container, and stop means for stopping the operation of said rotary plate means when the sensed remaining amount of the electrical insulation agent becomes less than a predetermined amount.

29. A battery disposal and collection apparatus comprising:

a battery guide case for containing a battery;

battery treating means provided in said battery guide case for effecting a disposal treatment to the battery contained in said battery guide case;

battery separation and detection means arranged in said battery guide case for identifying the type of the battery contained in said battery guide case on a basis of an identification mark provided on the battery or a color of the battery;

battery receiving means disposed adjacent to said battery guide case for storing the battery to which the disposal treatment is effected, said battery receiving means having a plurality of battery receiving portions provided at every type of the battery; and control means for controlling an operation of the apparatus in such a manner that the disposal treatment is effected to the battery contained in said battery guide case and that the battery to which the disposal treatment is effected is received in a corresponding battery receiving portion of the battery receiving means in accordance with the identified type of the battery.

* * * * *